(12) United States Patent
Okuno et al.

(10) Patent No.: US 7,758,041 B2
(45) Date of Patent: Jul. 20, 2010

(54) CLUTCH APPARATUS, CONVEYANCE APPARATUS AND RECORDING APPARATUS

(75) Inventors: Tokujiro Okuno, Kitakyushu (JP); Hiroyuki Tajima, Kitakyushu (JP); Kiyotaka Nakamura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 11/833,597

(22) Filed: Aug. 3, 2007

(65) Prior Publication Data
US 2008/0185776 A1 Aug. 7, 2008

(30) Foreign Application Priority Data
Aug. 3, 2006 (JP) ............... 2006-211654

(51) Int. Cl.
*B65H 5/00* (2006.01)
*B65H 1/08* (2006.01)

(52) U.S. Cl. .................. 271/147; 271/10.01; 271/10.04

(58) Field of Classification Search ................ 271/145, 271/147, 10.01, 10.04, 264; 192/71, 93 R
See application file for complete search history.

(56) References Cited

U.S. PATENT DOCUMENTS

| | | | |
|---|---|---|---|
| 5,860,645 A * | 1/1999 | Tomura et al. | 271/10.13 |
| 5,944,305 A * | 8/1999 | Takashima et al. | 271/127 |
| 6,257,569 B1 * | 7/2001 | Rhodes et al. | 271/117 |
| 7,357,388 B2 * | 4/2008 | Dan | 271/127 |
| 7,513,496 B2 * | 4/2009 | Hattori | 271/127 |
| 2003/0132567 A1 * | 7/2003 | Shimomura et al. | 271/10.01 |
| 2004/0017037 A1 * | 1/2004 | Kawakami et al. | 271/114 |
| 2006/0086203 A1 * | 4/2006 | Okuhara et al. | 74/640 |

FOREIGN PATENT DOCUMENTS

| | | | |
|---|---|---|---|
| JP | 2001341871 | * | 12/2001 |
| JP | 2004-002014 | | 1/2004 |

* cited by examiner

*Primary Examiner*—Patrick Mackey
*Assistant Examiner*—Patrick Cicchino
(74) *Attorney, Agent, or Firm*—Workman Nydegger

(57) ABSTRACT

[Object] To provide a clutch apparatus that can smoothly switch from a clutch engaged state to a clutch non-engaged state, while tooth jump does not occur even with a small-sized clutch apparatus.

[Solving Means] A recessed portion 153 is provided in a cam face of a cam 45. A cam shaft 13 is configured to pivot by a predetermined amount as a cam follower 51 is fitted in the recessed portion, and, when the cam initiates to engage the cam follower, it enters a clutch engaged state. A driven side gear 99 is pivoted by a predetermined amount as the cam follower is fitted in the recessed portion and, thereby, a clutch member 93 is rotated by a predetermined amount in a direction in which a toothed portion 94 is spaced apart from a drive side gear 92. In a state where the cam follower is not fitted in the recessed portion, when the clutch member 93 switches its clutch state, at least a portion of a swing locus of the toothed portion 94 of the clutch member 93 maintains a clearance with a gear tooth of the drive side gear 92.

1 Claim, 21 Drawing Sheets

CLUTCH APPARATUS, CONVEYANCE APPARATUS AND RECORDING APPARATUS

BACKGROUND

1. Technical Field

The present invention relates to a clutch apparatus that is mounted on various equipments including a recording apparatus, such as an ink jet recording apparatus, a copying machine, or a facsimile, and to a recording material conveyance apparatus that is provided with the clutch apparatus, and further to a recording apparatus.

2. Related Art

Patent Document 1 discloses a clutch member that switches between a clutch engaged state between a toothed portion and a ratchet gear and a clutch non-engaged state therebetween as it swings, and that transmits rotating force through a spur gear and a feeding roller gear to a feeding roller. A recessed portion is formed in a cam face of a cam provided on a feeding roller shaft. When a cam follower is fitted into the recessed portion by the urging force of a hopper spring, the feeding roller shaft slightly pivots. Thereby, the spur gear slightly pivots, while the clutch member slightly swings. Thus, the toothed portion is reliably spaced apart from the clutch member.

[Patent Document 1] Japanese Unexamined Patent Application Publication No. 2004-2014

However, in a clutch apparatus disclosed in Patent Document 1, switching from the clutch engaged state to the clutch non-engaged state may be smoothly performed. However, when the clutch apparatus is designed to be small for a small-sized printer, a gear tooth of the ratchet gear itself becomes small. Thus, in the clutch engaged state, an engaged state between the toothed portion and the ratchet gear becomes unreliable and, hence, tooth jump has sometimes occurred. As a result, the timing of a member, such as a cam, is off, and there has been an inconvenience, for example, in which the feeding timing of a sheet of paper is influenced.

SUMMARY

An object of the invention is to provide a clutch apparatus that can smoothly switch from a clutch engaged state to a clutch non-engaged state, while tooth jump does not occur even with a small-sized clutch apparatus, to provide a recording material conveyance apparatus provided with the clutch apparatus, and further to provide a recording apparatus.

In order to achieve the above object, a clutch apparatus according to a first aspect of the invention is a clutch apparatus for connecting or disconnecting power transmission from a drive side gear, which is driven by a drive motor for rotation, to a driven side gear includes a cam provided on a driven rotary shaft of the driven side gear or a gear that is engaged at a downstream side of drive transmission of the driven side gear, a cam follower provided to press contact the cam, a clutch member that has an engaging pawl and a toothed portion, which is engageable with the drive side gear, and that is switchable between a clutch engaged state between the toothed portion and the drive side gear and a clutch non-engaged state therebetween as the clutch member swings, an arm that is pivotable about a pivot fulcrum, a clutch engaging portion that is provided on the arm and engageable with the engaging pawl, and a lever member that swings the clutch member to switch from the clutch engaged state to the clutch non-engaged state in such a manner that the clutch member and the driven side gear engage the engaging pawl with the clutch engaging portion, wherein, when the cam follower is fitted in the recessed portion, it enters the clutch engaged state, and the cam follower is configured so that the clutch member is rotated by a predetermined amount in a direction in which the toothed portion is spaced apart from the drive side gear by pivoting the driven side gear by a predetermined amount, wherein, when the cam follower is not fitted in the recessed portion, it enters the clutch non-engaged state, and wherein, when a clutch state switches, at least a portion of a swing locus of the toothed portion of the clutch member maintains a clearance with a gear tooth of the drive side gear. Thus, it is configured.

According to the first aspect of the invention, when the clutch member is engaged with the drive side gear and drive transmission is normally performed, even when the clutch member tries to swing in a direction away from the drive side gear, the toothed portion of the clutch member is caught by the gear tooth of the drive side gear in a swinging process of the clutch member and, hence, the clutch member hardly comes off from the drive side gear. Thus, it has a structure that tooth jump hardly occurs. On the other hand, when the clutch member is made to enter the clutch non-engaged state, the cam follower instantly moves to fit into the recessed portion just before the engaging pawl engages the clutch engaging portion, so that the clutch member actively moves in a direction in which the toothed portion of the clutch member is spaced apart from the gear tooth of the drive side gear. Thus, the toothed portion leaves the drive side gear. Then, just after that, the engaging pawl engages the clutch engaging portion and the clutch member then swings. Therefore, the toothed portion of the clutch member comes off from the gear tooth of the drive side gear, and it can enter the clutch non-engaged state.

The clutch apparatus according to a second aspect of the invention is configured, in the first aspect, so that, when the engaging pawl engages the clutch engaging portion, the clutch engaging portion pushes the engaging pawl to swing the clutch member and, thereby, the toothed portion of the clutch member is spaced apart from the drive side gear with a clearance.

According to the second aspect of the invention, in addition to the function and advantageous effects of the first aspect, when the engaging pawl engages the clutch engaging portion, the clutch member swings about a swing fulcrum so that the toothed portion of the clutch member is completely spaced apart from the drive side gear in such a manner that the clutch engaging portion pushes the engaging pawl. Thus, click sound that is generated due to a collision of the toothed portion of the clutch member with the drive side gear is prevented.

The clutch apparatus according to a third aspect of the invention, in the second aspect, includes a lever pivot gear provided coaxially with the lever shaft and is driven by power transmission that is branched from a drive transmission system to the drive side gear, wherein the lever pivot gear and the lever shaft are coupled through a differential device, wherein the differential device is configured so that, when an engagement between the engaging pawl and the clutch engaging portion is released, the lever member is pivoted in a direction away from the clutch member and, when the engaging pawl is engaged with the clutch engaging portion, the lever member is pivoted in a direction to approach toward the clutch member, and wherein power is transmitted after the clutch member is pivoted to a position at which the clutch engaging portion does not re-engage the engaging pawl even when the lever member is pivoted to approach.

According to the third aspect of the invention, in addition to the function and advantageous effects of the first aspect or the second aspect, because the lever pivot gear and the lever shaft are coupled through the differential device, the size of the lever member is reduced, and, even when the swing angle thereof is small, it is possible to reliably prevent the trigger lever from returning before the toothed portion of the clutch member engages the ratchet wheel. That is, it is possible to realize a clutch apparatus that may be reduced in size.

In addition, a fourth aspect of the invention provides a recording material conveyance apparatus that is provided with a drive motor, a clutch apparatus for connecting or disconnecting power transmission from a drive side gear, which is driven by the drive motor for rotation, to a driven system, and a feeding roller shaft, to which a feeding roll that applies feeding force to a recording material is fixed and which belongs to the driven system, the feeding roller being rotated by power transmitted from the drive side gear, wherein the clutch apparatus is the clutch apparatus as set forth in the second aspect. According to the invention, in the recording material conveyance apparatus, such as a paper feeding apparatus, the same function and advantageous effects as those of the first aspect to the second aspect may be obtained. Furthermore, a fourth aspect of the invention provides a recording apparatus that is provided with a recording material conveyance apparatus and a record performing unit that performs recording on a recording material that is fed from the recording material conveyance apparatus, wherein the recording material conveyance apparatus is the recording material conveyance apparatus according to the third aspect.

BRIEF DESCRIPTION OF THE DRAWINGS

FIG. 15(a) is a view that illustrates a clutch non-engaged state, and FIG. 15(b) is the enlarged cross-sectional view of a relevant part shown together.

Figure 1:
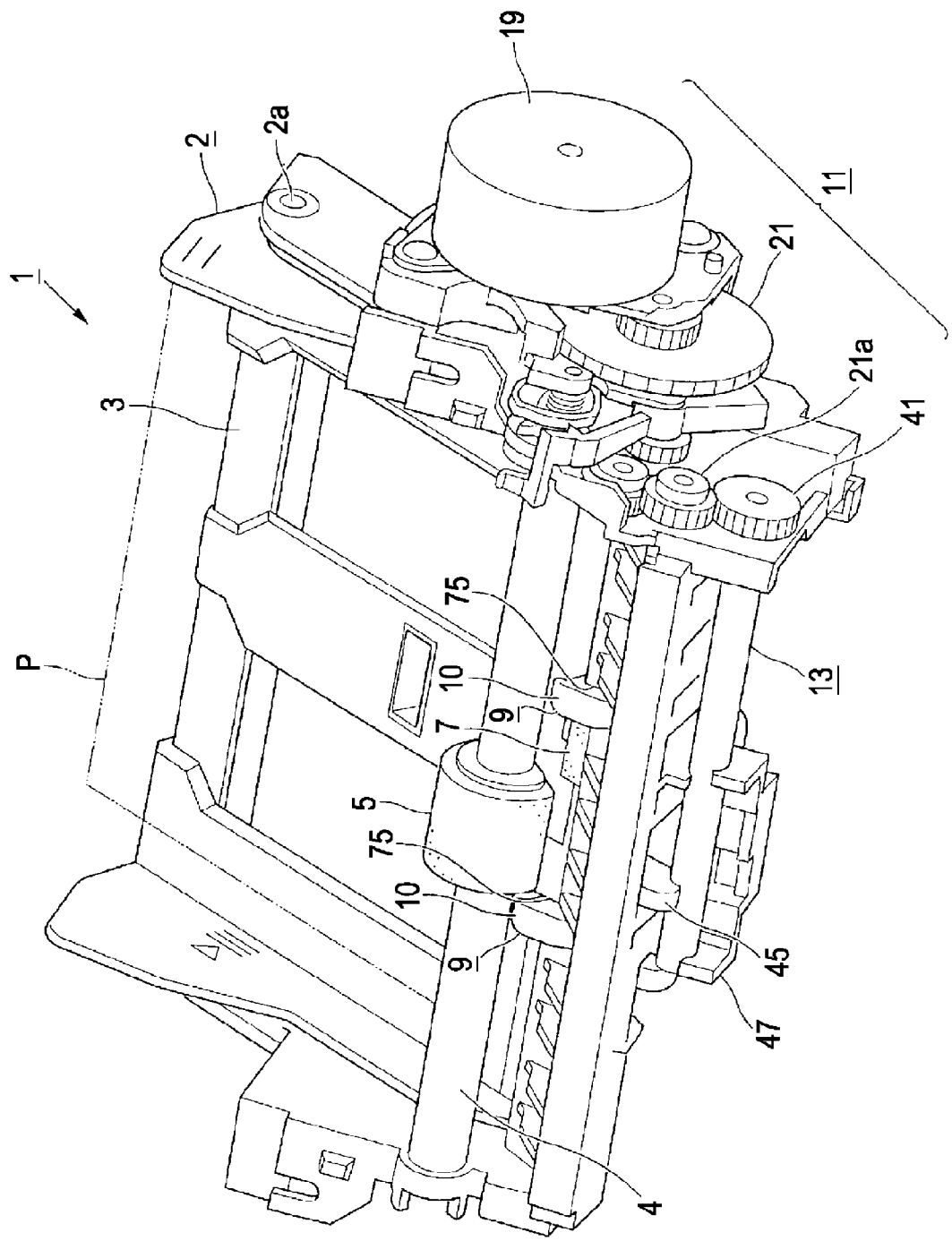
FIG. 1 is a perspective view of a conveyance apparatus of an ink jet printer to which the invention is applicable as viewed from the front lower side.

DESCRIPTION OF SYMBOLS conveyance apparatus 1; hopper 2; swing fulcrum of the hopper 2a; feeding tray 3; feeding roller shaft 4; feeding roller 5; auxiliary roller 6; separation pad 7; medium return lever 9; distal end of the medium return lever 10; drive transmission system 11; cam shaft 13; hopper actuating member 15; cam transmission return member 16; return action member 17; drive motor 19; gear 21; gear 21a; cam shaft gear 41; first cam 43; second cam 45; base frame 47; shaft receiving portion 48; hopper pressing portion 49; pivotal shaft of the hopper actuating member 50; second cam receiving portion 51; movement regulating abutment portion 52; torsion spring 53; hopper action end 55; first cam receiving portion 57; spring engaging portion 59; guide plate 61; guide clearance 63; coil spring 65; shaft portion 67; shaft end 68; lever proximal portion 69; slide plate 70; torsion spring 71; cam guided portion 73; cutout 75; cam guide face 77; feeding shaft of the feeding roller 78; gear tooth of the ratchet wheel 79; output pinion of the drive motor 81; first gear 83; second gear 85; third gear 87; fourth gear 89; fifth gear 91; ratchet wheel 92; clutch member 93; toothed portion 94; torsion coil spring 95; swing fulcrum 96; clutch auxiliary member 97; engaging pawl 98; sixth gear 99; engaging projecting portion 100; seventh gear 101; eighth gear 111; lever shaft 113; trigger lever 115; arm 116; compression spring 117; driven differential gear 119; friction clutch mechanism 121; clutch engaging portion 123; engaging face of the engaging pawl 125; engaging face of the clutch engaging portion 127; engaged projecting portion 129; non-transmission portion 131; cylindrical proximal portion 133; annular portion 135; accommodation portion 137; slide contact piece 139; pivot locus of the clutch engaging portion 141; arrow 143; first end of the engaging projecting portion 145; second end of the engaging projecting portion 147; top portion of the second cam 149; cam inclined face 151; recessed portion 153; a state where it is spaced apart 155; distal end portion of the toothed portion adjacent to the gear tooth 156; pivot locus of the toothed portion 157.

DESCRIPTION OF EXEMPLARY EMBODIMENTS

Figure 2:
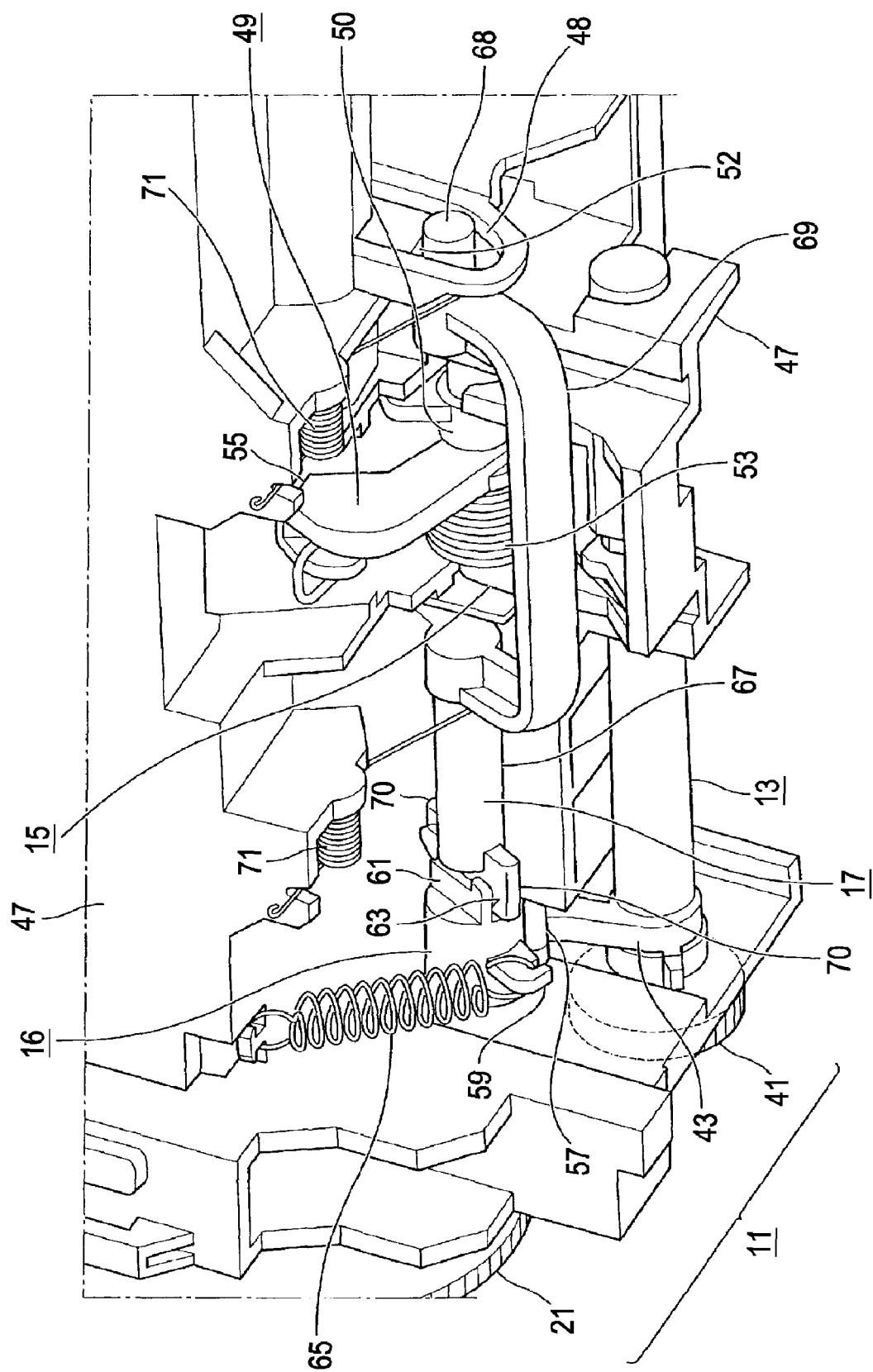
FIG. 2 is a rear perspective view of a hopper when a medium return lever is up.
Figure 3:
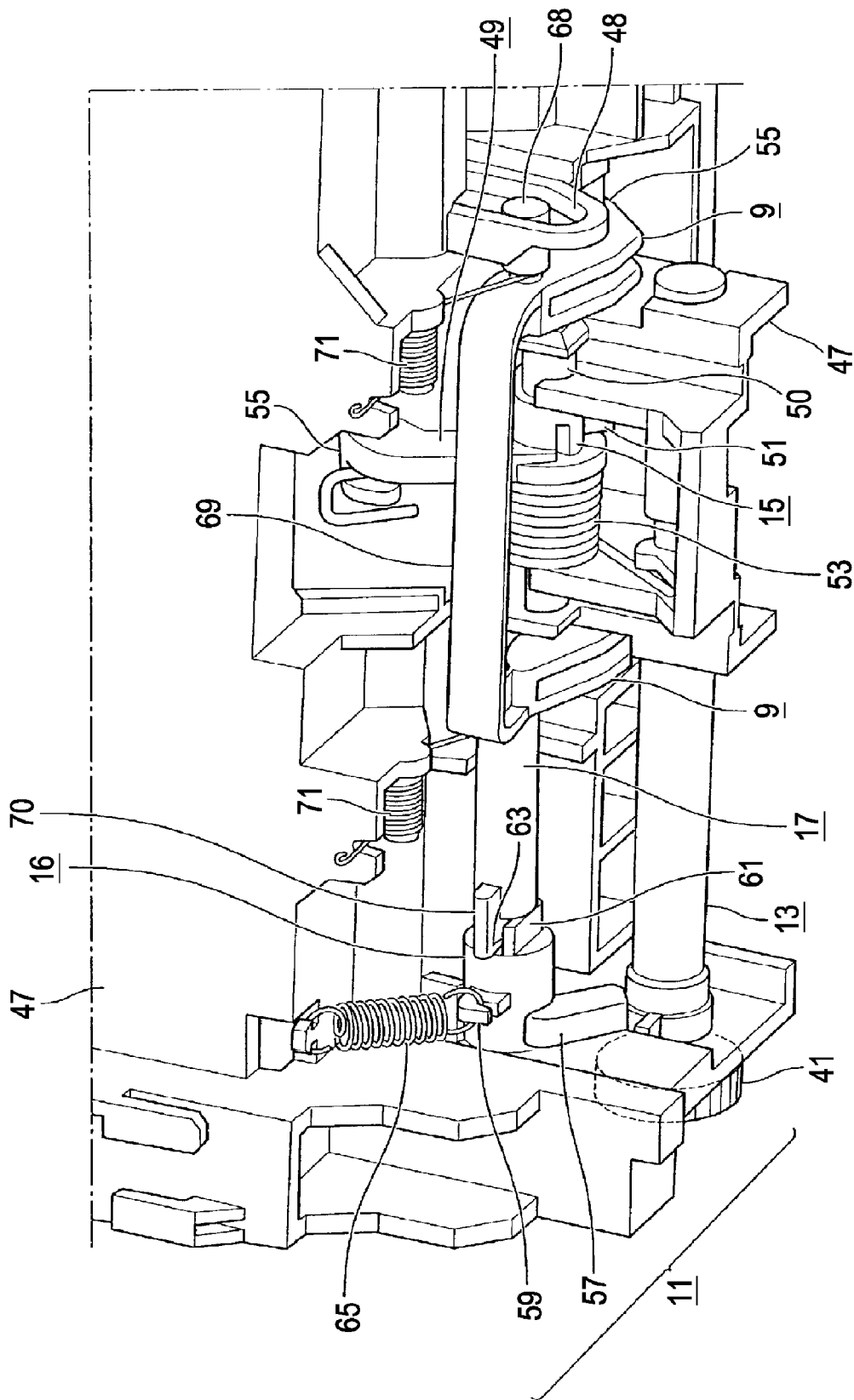
FIG. 3 is a rear perspective view of the hopper when the medium return lever is down.
Figure 4:
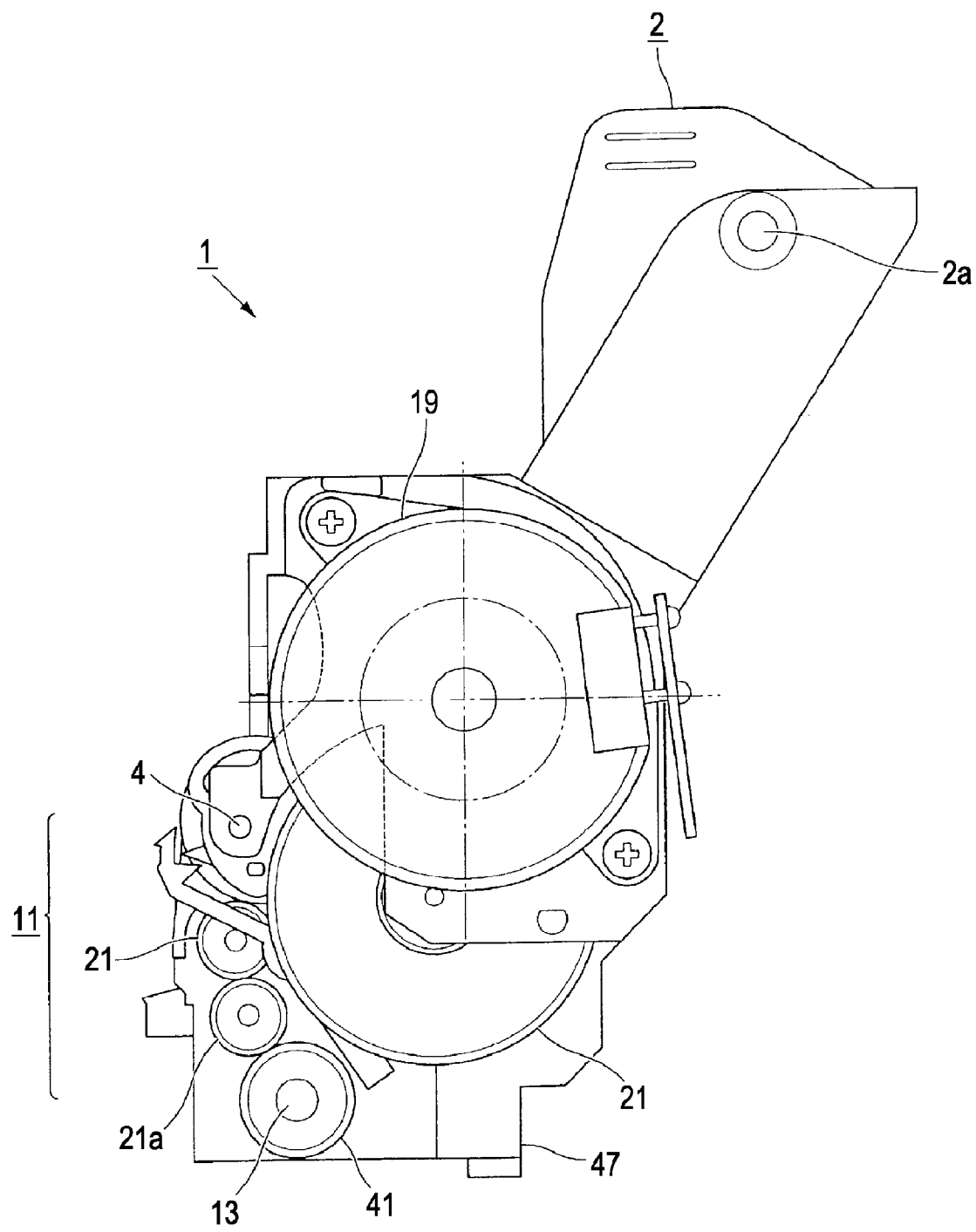
FIG. 4 is a right side view of the conveyance apparatus.
Figure 5:
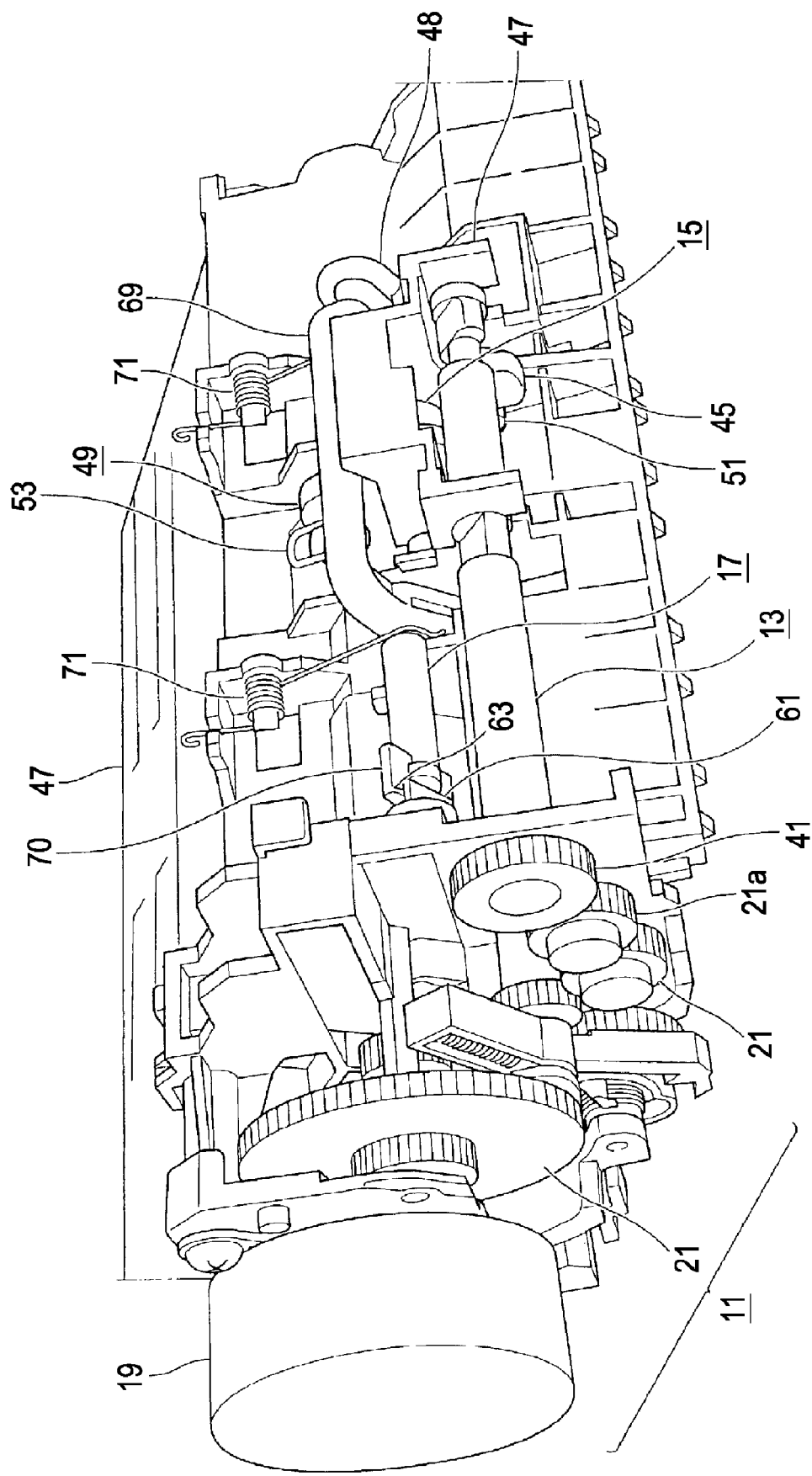
FIG. 5 is an enlarged perspective view of a hopper actuating member and its periphery.
Figure 10:
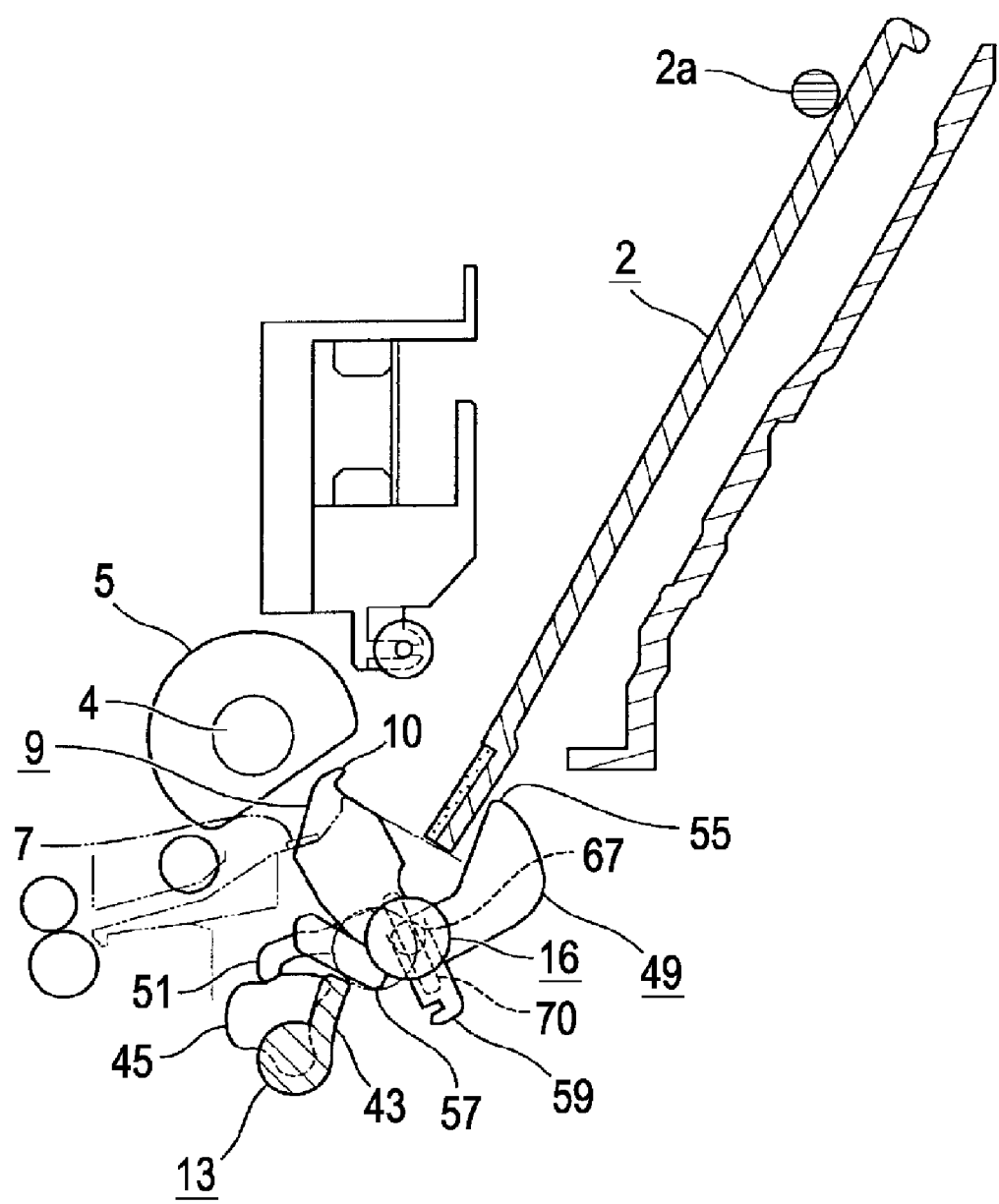
FIG. 10 is a side view that shows a state when the hopper is reset.
Figure 11:
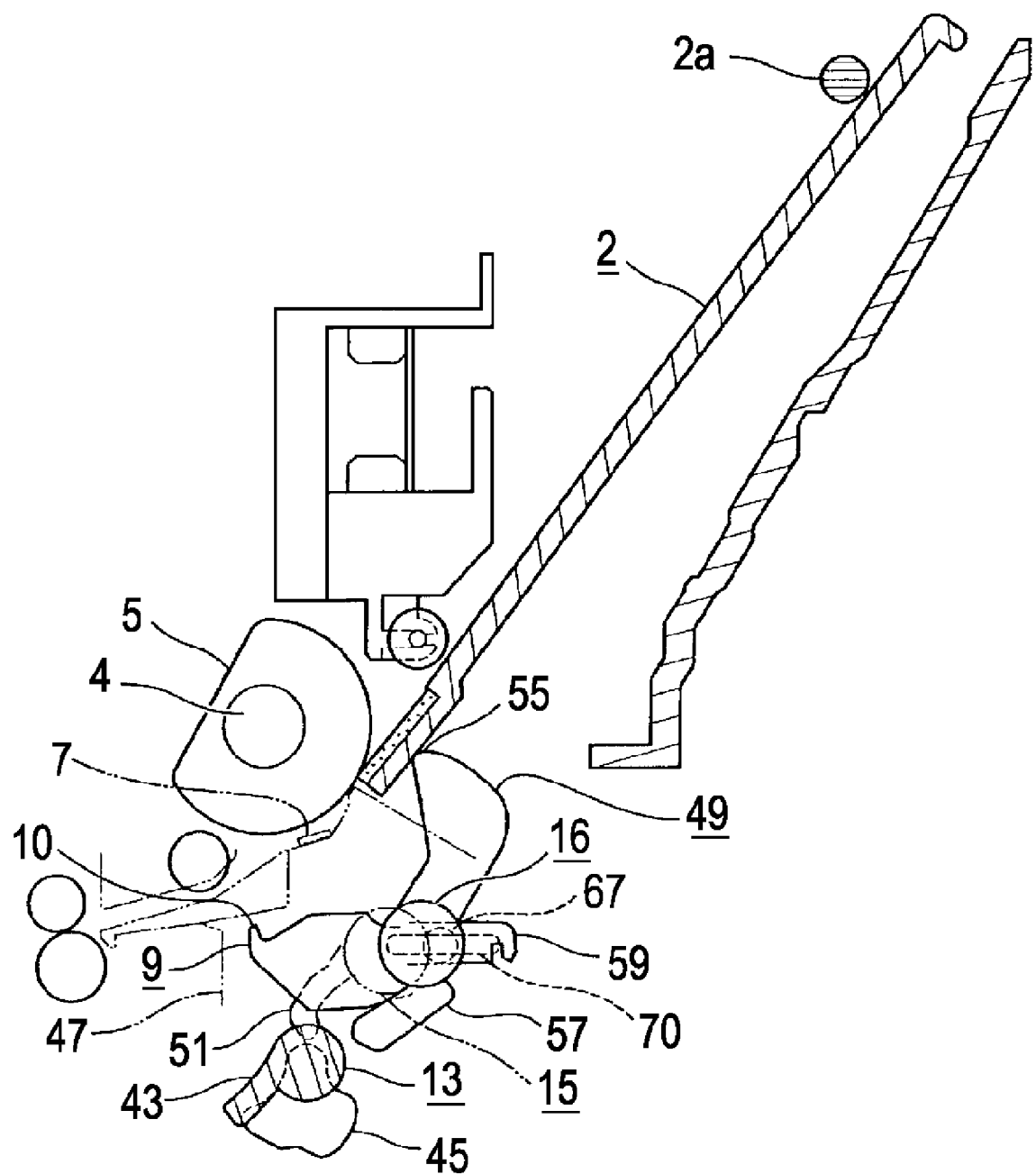
FIG. 11 is a side view that shows a state when the hopper is up.

Hereinafter, an embodiment of the present invention will be described with reference to the drawings. FIG. 1 is a perspective view of a recording material conveyance apparatus of an ink jet printer, to which a recording material conveyance apparatus according to the invention is applicable, as viewed from the front lower side. FIG. 2 is a rear perspective view of a hopper when a medium return lever is up. FIG. 3 is a rear perspective view of the hopper when the medium return lever is down. FIG. 4 is a right side view of the recording material conveyance apparatus. FIG. 5 is an enlarged perspective view of a hopper actuating member and its periphery. FIG. 6 to FIG. 9 are views that show the relationship between the rotational position of a cam shaft and the medium return lever step by step. FIG. 10 is a side view that shows a state when the hopper is reset. FIG. 11 is a side view that shows a state when the hopper is up.

Figure 12:
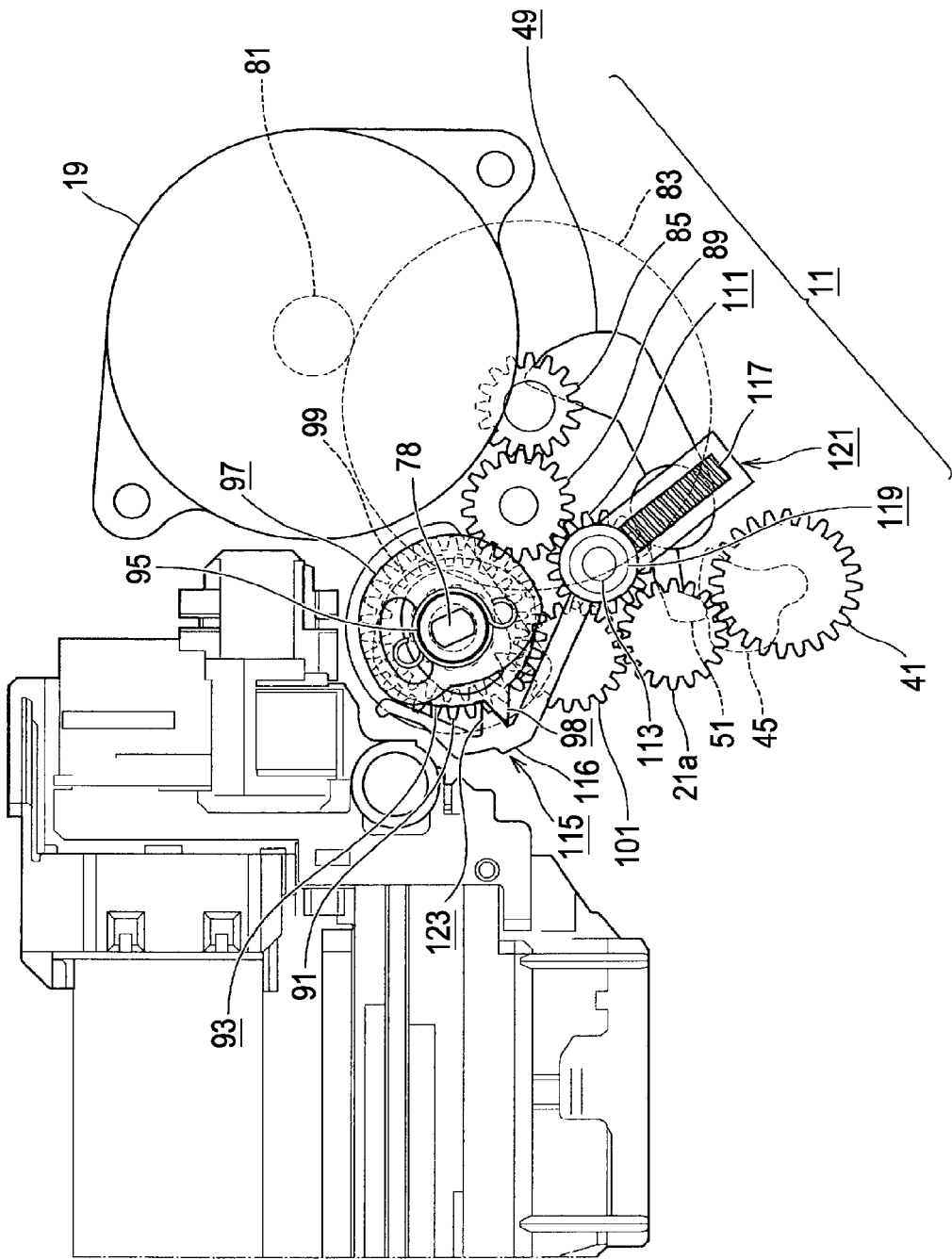
FIG. 12 is a side view that shows a drive transmission system that is mounted on the conveyance apparatus.
Figure 13:
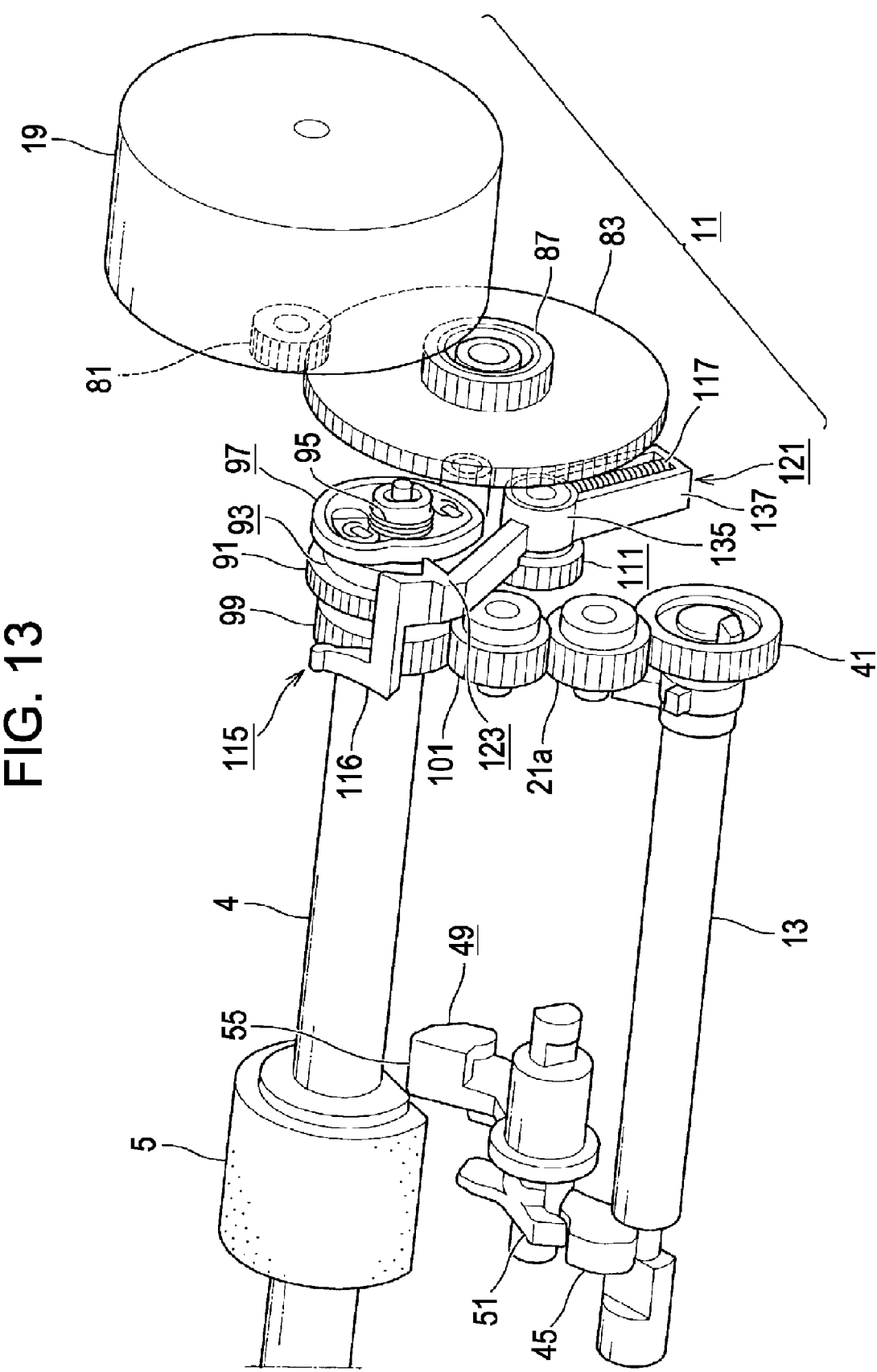
FIG. 13 is a perspective view that shows the drive transmission system.
Figure 14:
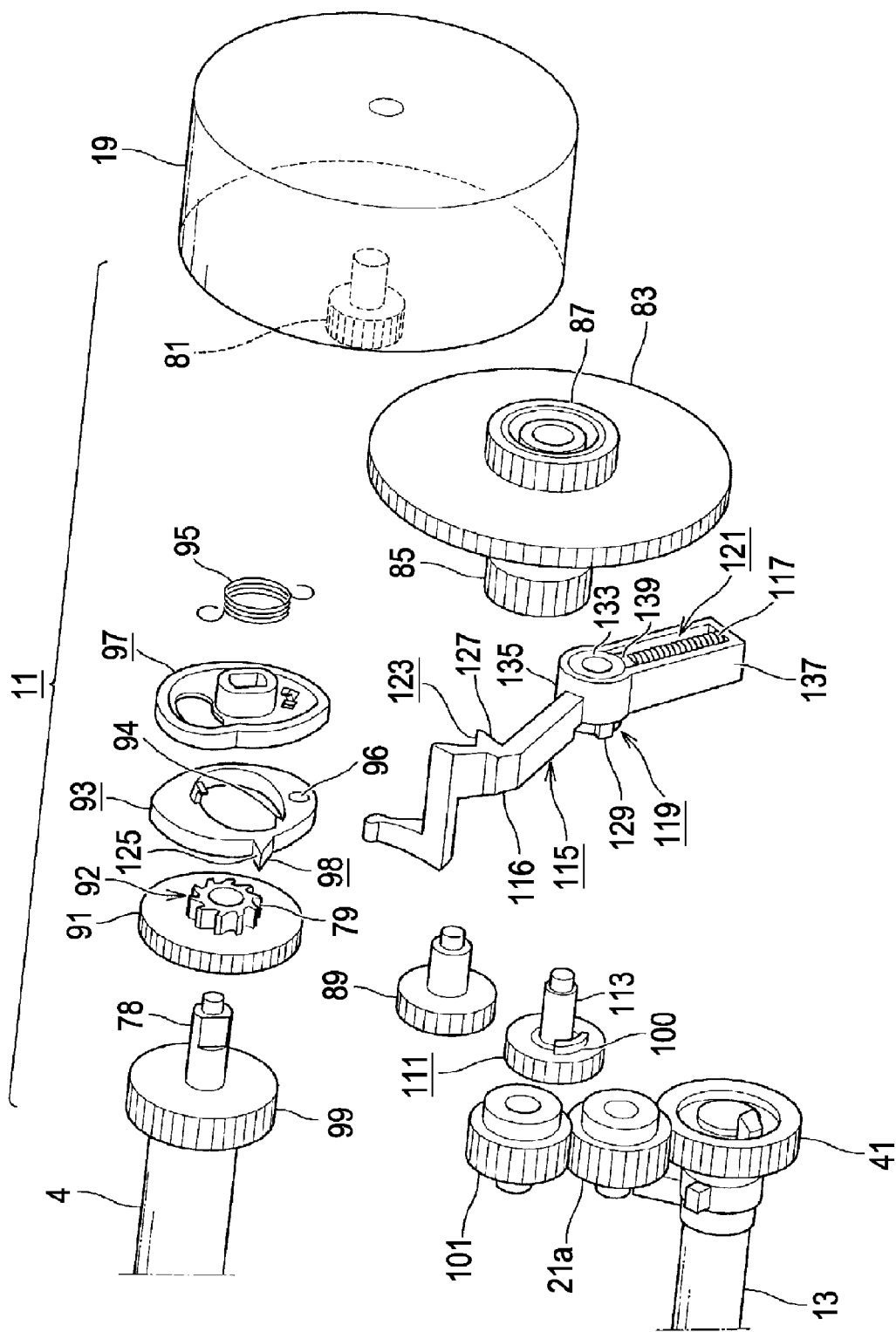
FIG. 14 is an exploded perspective view of the drive transmission system.
Figures 15, 16:
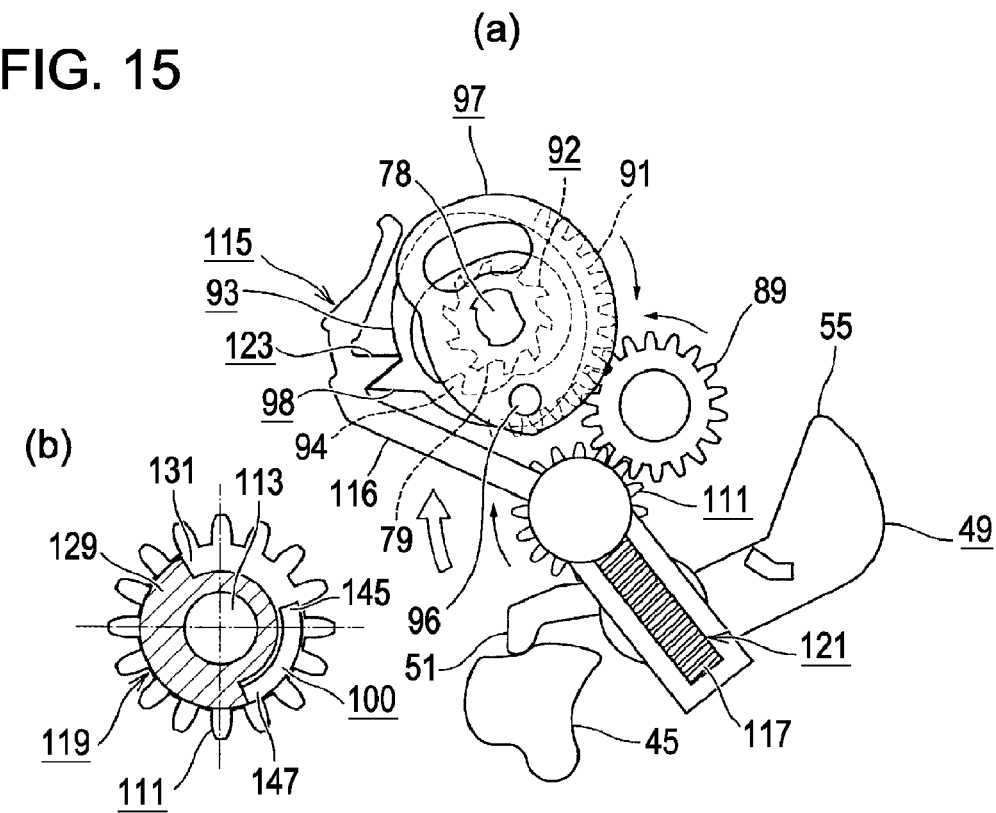
FIG. 16 is a view that illustrates a state where an engaging pawl is engaged with a clutch engaging portion.
Figure 17:
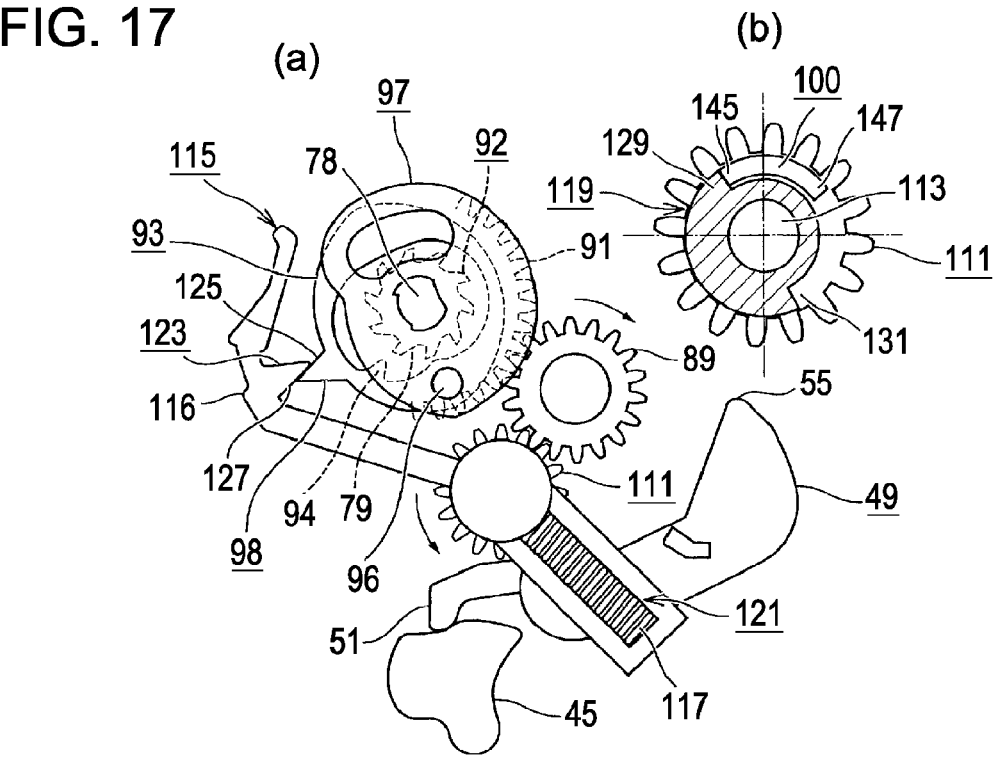
FIG. 17(a) is a view that illustrates the timing when switching to a clutch engaged state is initiated.
FIG. 17(b) is the enlarged cross-sectional view of a relevant part shown together.
Figure 18:
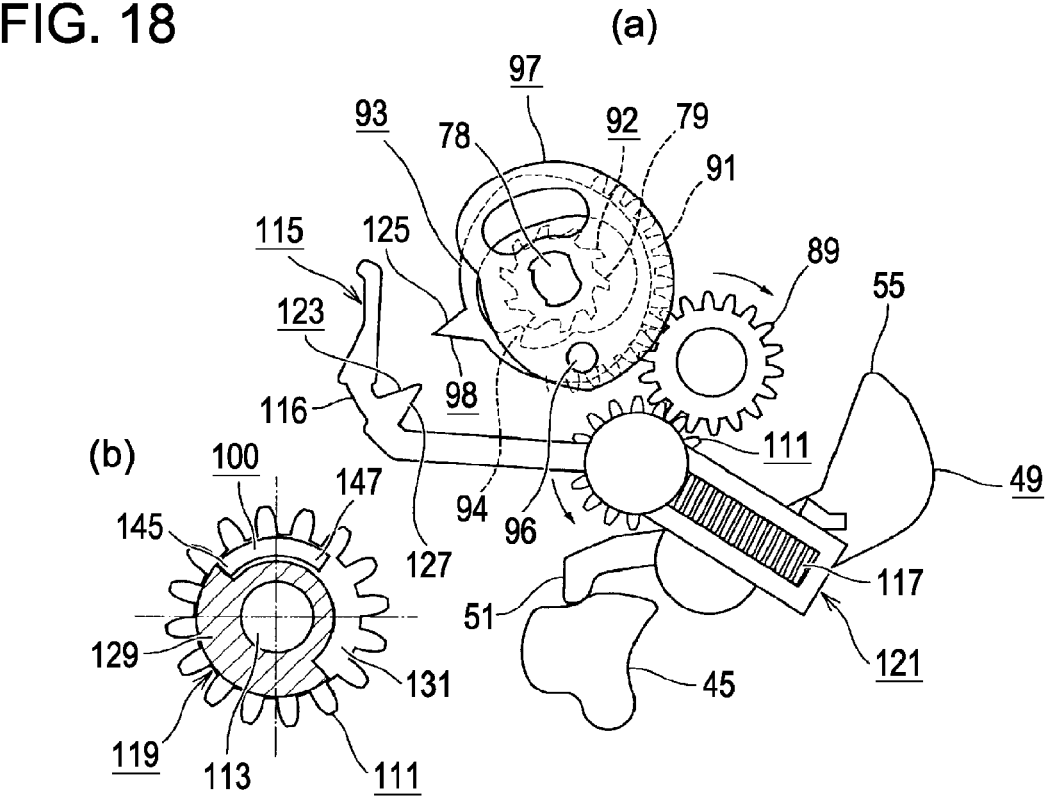
FIG. 18(a) is a view that illustrates a state where a toothed portion is colliding with a gear tooth of a ratchet wheel.
FIG. 18(b) is the enlarged cross-sectional view of a relevant part shown together.
Figure 19:
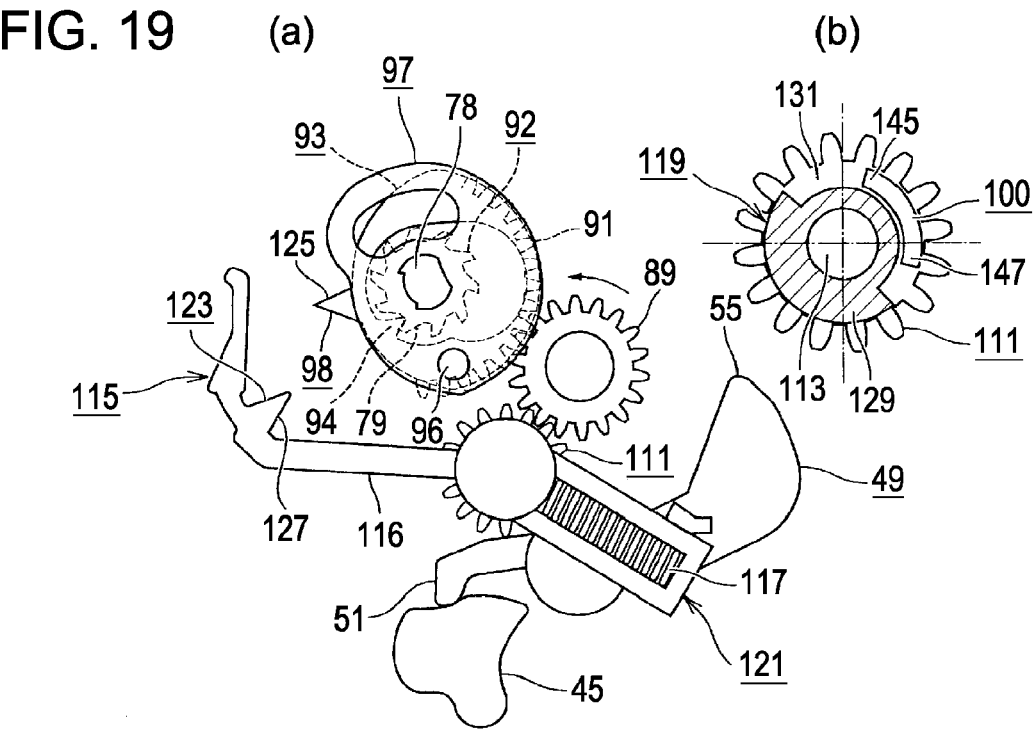
FIG. 19(a) is a view that illustrates the clutch engaged state.
FIG. 19(b) is the enlarged cross-sectional view of a relevant part shown together.
Figure 20:
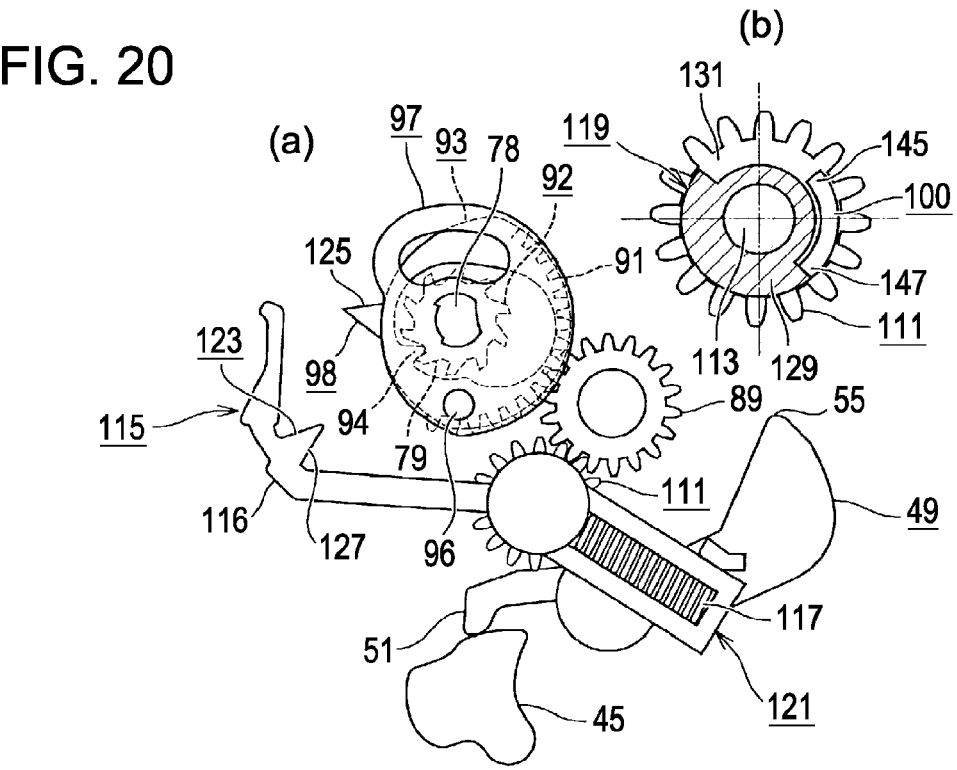
FIG. 20(a) is a view that illustrates the timing when a trigger lever is initiated to be raised.
FIG. 20(b) is the enlarged cross-sectional view of a relevant part shown together.
Figure 21:
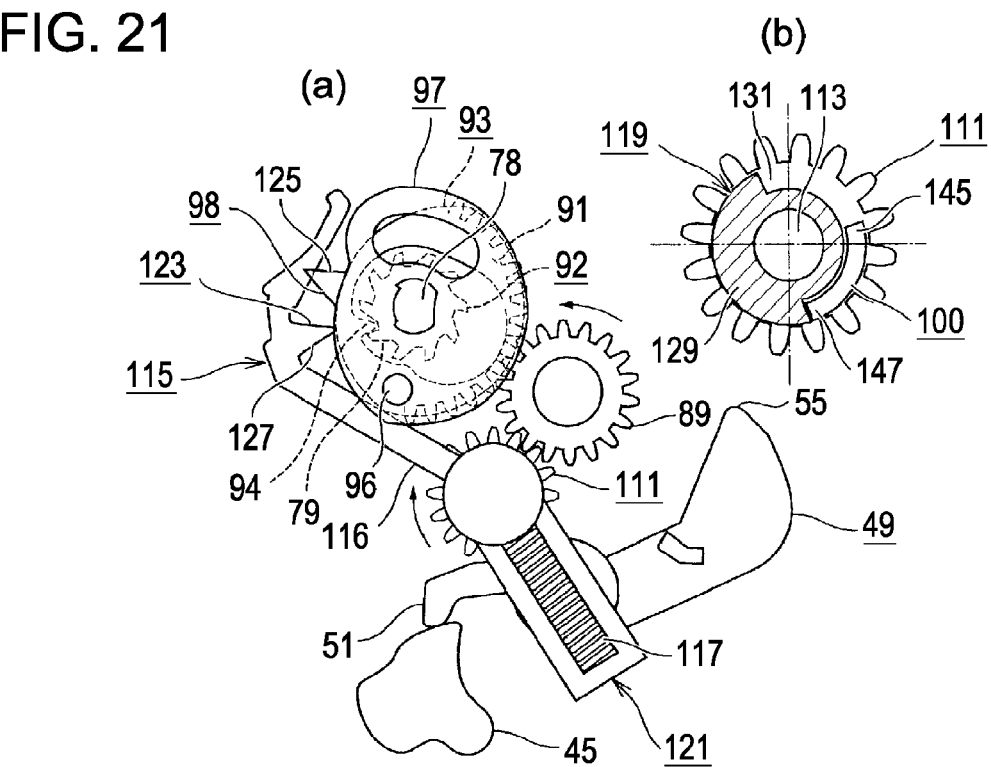
FIG. 21(a) is a view that illustrates the timing when raising of the trigger lever has been completed.
FIG. 21(b) is the enlarged cross-sectional view of a relevant part shown together.
Figure 22:
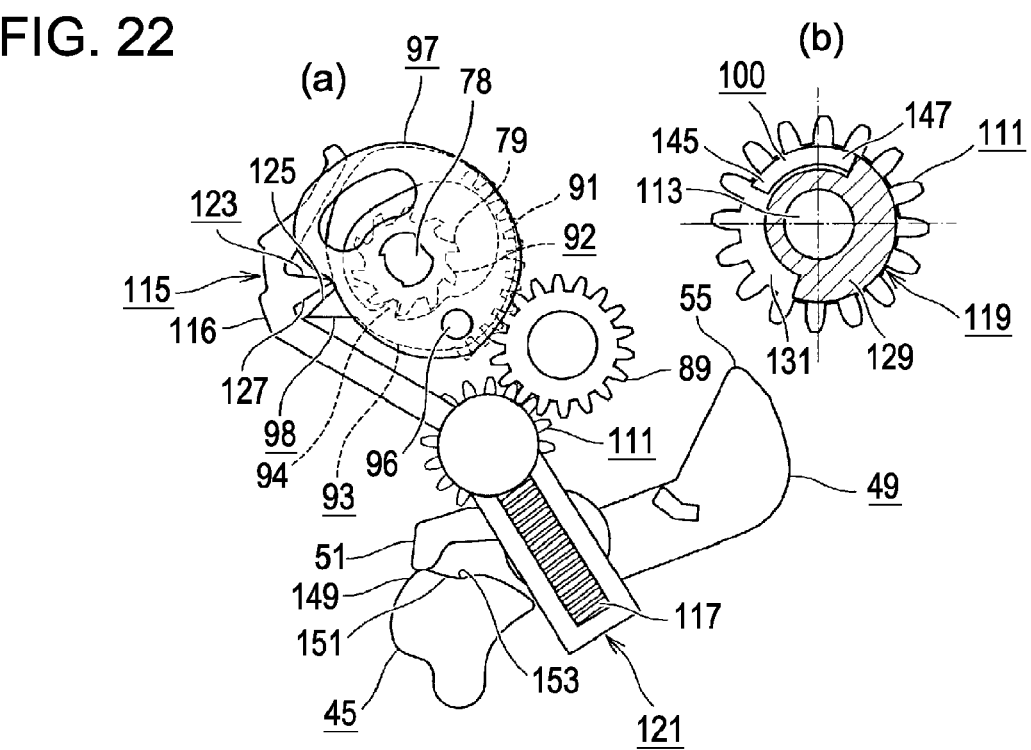
FIG. 22(a) is a view that illustrates a state just before the engaging pawl is engaged with the clutch engaging portion.
FIG. 22(b) is the enlarged cross-sectional view of a relevant part shown together.
Figure 23:
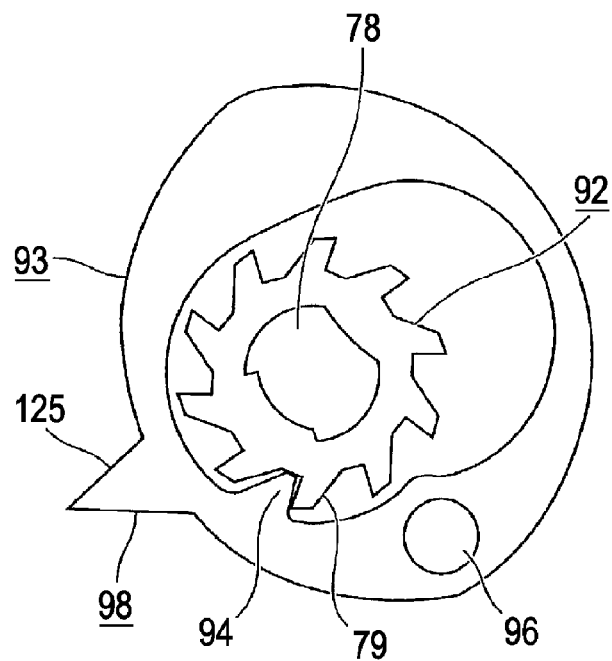
FIG. 23 is a view that illustrates a state where the toothed portion is engaged with the gear tooth of the ratchet wheel.
Figure 24:
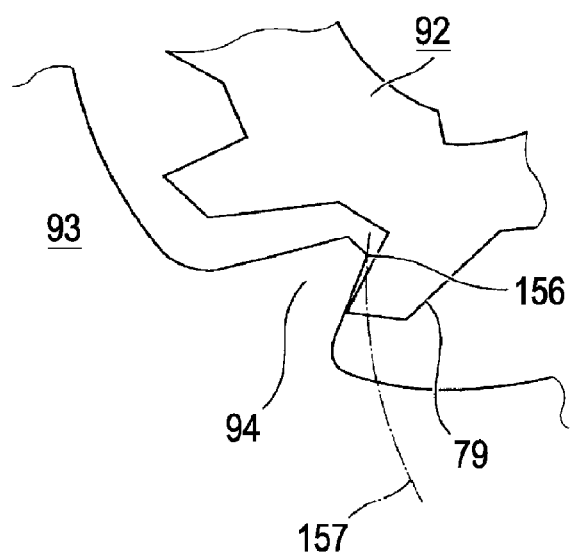
FIG. 24 is a view that illustrates a state where a pivot locus of the toothed portion passes across the gear tooth.
Figure 25:
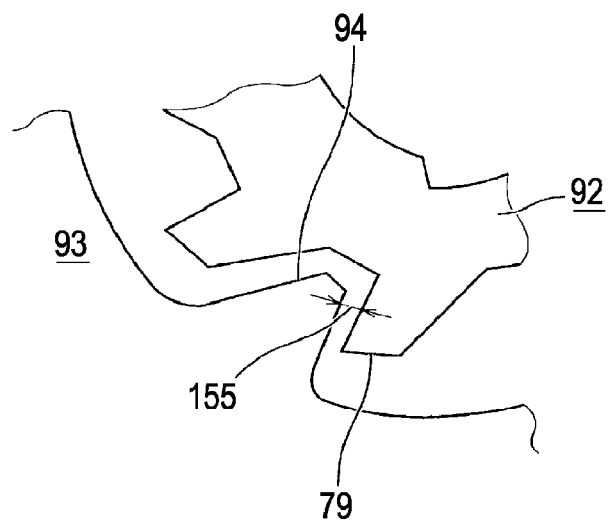
FIG. 25 is a view that illustrates a state where the toothed portion is moved away from the gear tooth of the ratchet wheel.
Figure 26:
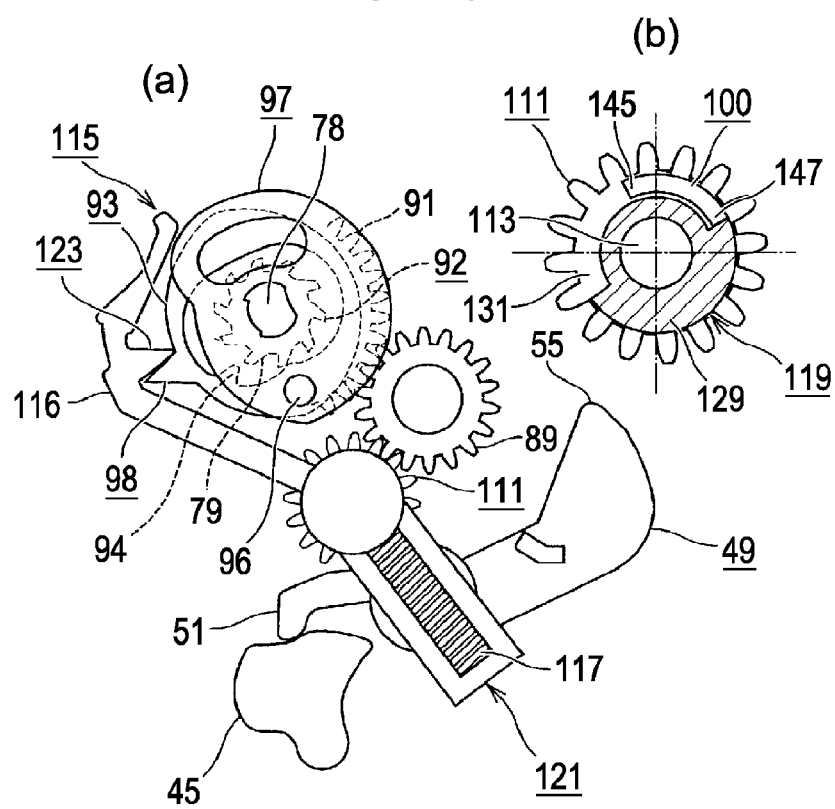
FIG. 26(a) is a view that illustrates a state where it is switched to the clutch non-engaged state.
FIG. 26(b) is the enlarged cross-sectional view of a relevant part shown together.
Figure 27:
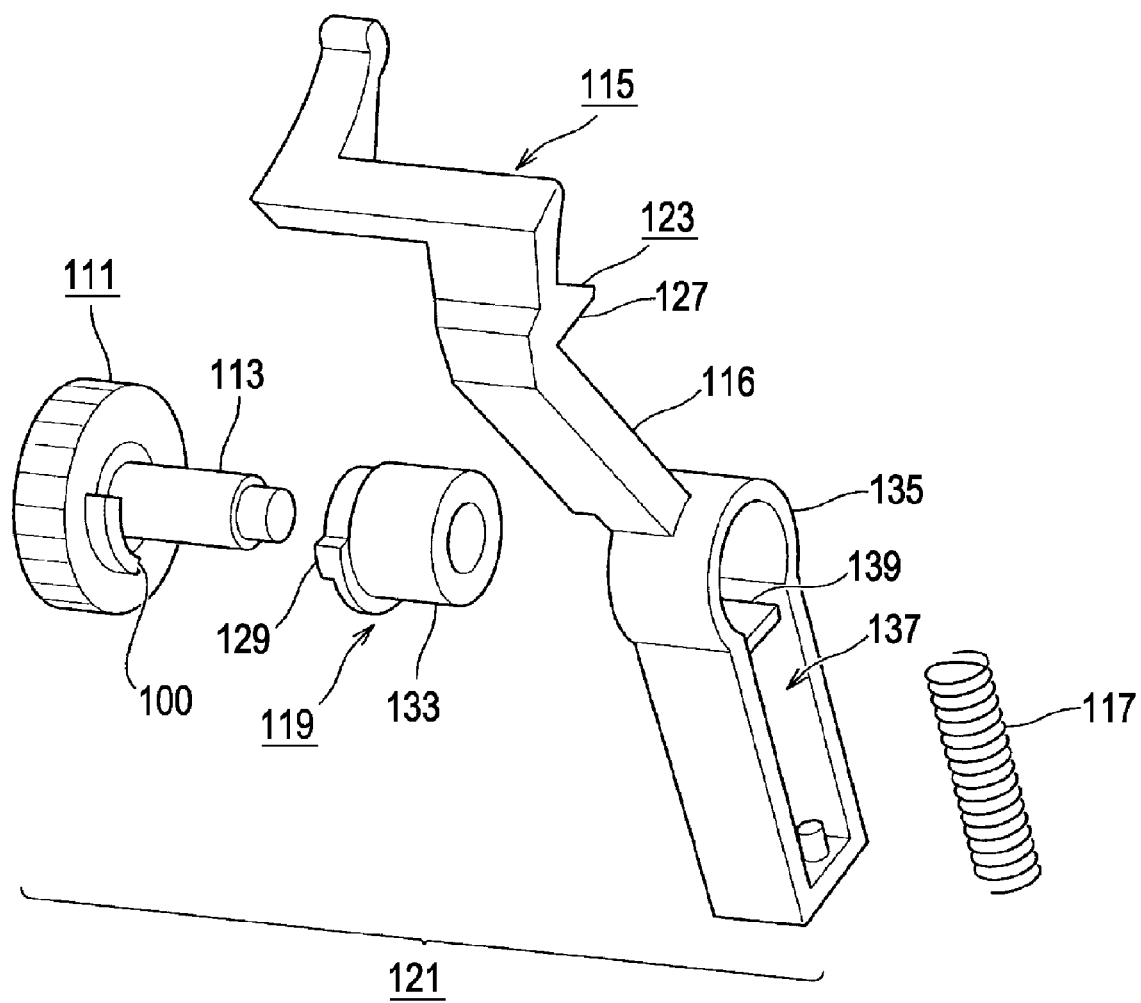
FIG. 27 is a perspective view of a friction clutch mechanism.

In addition, FIG. 12 is a side view that shows a drive transmission system mounted on the conveyance apparatus. FIG. 13 is a perspective view that shows the drive transmission system. FIG. 14 is an exploded perspective view of the drive transmission system. FIG. 15($a$) is a view that illustrates a clutch non-engaged state, and FIG. 15($b$) is the enlarged cross-sectional view of a relevant part shown together. FIG. 16 is a view that illustrates a state where an engaging pawl is engaged with a clutch engaging portion. FIG. 17($a$) is a view that illustrates the timing when switching to a clutch engaged state is initiated, and FIG. 17($b$) is the enlarged cross-sectional view of a relevant part shown together. FIG. 18($a$) is a view that illustrates a state where a toothed portion is colliding with a gear tooth of a ratchet wheel, and FIG. 18($b$) is the enlarged cross-sectional view of a relevant part shown together. FIG. 19($a$) is a view that illustrates the clutch engaged state, and FIG. 19($b$) is the enlarged cross-sectional view of a relevant part shown together. FIG. 20($a$) is a view that illustrates the timing when a trigger lever is initiated to be raised, and FIG. 20($b$) is the enlarged cross-sectional view of a relevant part shown together. FIG. 21($a$) is a view that illustrates the timing when raising of the trigger lever has been completed, and FIG. 21($b$) is the enlarged cross-sectional view of a relevant part shown together. FIG. 22($a$) is a view that illustrates a state just before the engaging pawl engages the clutch engaging portion, FIG. 22($b$) is the enlarged cross-sectional view of a relevant part shown together. FIG. 23 is a view that illustrates a state where the toothed portion is engaged with the gear tooth of the ratchet wheel. FIG. 24 is a view that illustrates a state where a pivot locus of the toothed portion passes across the gear tooth. FIG. 25 is a view that illustrates a state where the toothed portion is moved away from the gear tooth of the ratchet wheel. FIG. 26($a$) is a view that illustrates a state where it is switched to the clutch non-engaged state, and FIG. 26($b$) is the enlarged cross-sectional view of a relevant part shown together. FIG. 27 is a perspective view of a friction clutch mechanism.

The recording material conveyance apparatus 1 shown in FIG. 1 is a conveyance apparatus for a recording apparatus, such as an ink jet printer, that performs recording on a relatively small recording material, such as a postcard or a business card, or a conveyance apparatus for a liquid ejecting apparatus that ejects liquid on a relatively small liquid ejected target medium in a similar manner. As compared to a conveyance apparatus for a recording apparatus that is normally used at an office, such as A4 or B5 recording apparatus according to Japanese Industrial Standards, the overall size is small. Note that the conveyance apparatus for a liquid ejecting apparatus has substantially the same structure as that of the conveyance apparatus for a recording apparatus, so that, in the following description, the conveyance apparatus for a recording apparatus will be mainly described.

The recording material conveyance apparatus 1 includes a feeding tray 3 that is able to obliquely hold a plurality of sheets of recording paper P as they are stacked and is also provided with a hopper 2 of which a lower end side is swingable about an upper end side swing fulcrum 2$a$, and then a feeding roller 5 is rotatably supported by a feeding roller shaft 4 provided to the upper side just in front of the feeding tray 3.

A separation pad 7 is provided at a position opposed to the feeding roller 5. That is, the recording material P is pinched and held by the feeding roller 5 and the hopper 2. In this state, the recording material P is picked up from the feeding tray 3 by rotating the feeding roller 5. However, when two or more overlapped sheets of recording material P on the feeding tray 3 tend to be fed (hereinafter, this state is termed as "overlapping feed") the separation pad 7, which is a separation means that serves to separate the uppermost recording material P from another recording material, is provided in order to make only the uppermost recording material P advance to the downstream side in the feeding direction, that is, to the front side. The separation pad 7 is formed of an elastic material, such as elastomer, and, microscopically, the distal end of the recording material P moves downstream as it slightly dents into the pad surface.

In addition, medium return levers 9 are provided in proximity to the downstream side of the hopper 2 in order to return the overlapped recording material(s) P other than the uppermost material to the feeding tray 3. The hopper 2 and the medium return levers 9 are configured to be actuated through the same drive system. That is, the hopper 2 is actuated through the drive transmission system 11, a cam shaft 13 that splits power transmitted through the drive transmission system 11 into the hopper 2 and the medium return levers 9, and a hopper actuating member 15 (see FIG. 2) that transmits driving from the cam shaft 13, which is a moved rotary shaft, to the hopper 2. On the other hand, the medium return levers 9 are actuated through the drive transmission system 11, the cam shaft 13, a cam transmission return member 16 and a return action member 17 (see FIG. 2). Note that, because the medium return levers 9 pivot while their distal ends are in contact with the rear face of a transported recording material as will be described later, its frictional resistance is preferably as small as possible and it is desirably formed of a material having a small sliding resistance, such as polyacetal resin. Hereinafter, the configuration of these components will be described in detail.

The drive transmission system 11 includes a drive motor 19 and a plurality of gears 21 that engage an output pinion of the drive motor 19. The last gear 21$a$ of the drive transmission system 11 engages a cam shaft gear 41, which is formed at the end of the cam shaft 13. Note that the cam shaft gear 41 corresponds to a gear of a driven side gear, which is engaged at a downstream side of drive transmission. The cam shaft 13 has a first cam 43 (see FIG. 2) formed in proximity to the cam transmission return member 16, and also has a second cam 45 (see FIG. 1), which corresponds to a cam provided on the cam shaft 13, or the moved rotary shaft, formed in proximity to the return action member 17. Through these first cam 43 and second cam 45, driving power of the drive motor 19 is transmitted to the medium return levers 9 and the hopper 2, respectively.

As shown in FIG. 2, FIG. 3 and FIG. 5, the hopper actuating member 15 is pivotally supported on the base frame 47, and a hopper pressing portion 49 and a cam receiving portion 51 (see FIG. 3 and FIG. 5) are formed to extend from a pivotal shaft 50 (see FIG. 2 and FIG. 3). In addition, a torsion spring 53, which is an urging means for a cam mechanism, is provided on the pivotal shaft 50 of the hopper actuating member 15. One end of the torsion spring 53 is fixed to the base frame 47, and the other end is engaged with the hopper pressing portion 49. A hopper action end 55 is formed at the end of the hopper pressing portion 49, and the hopper action end 55 is in contact with the lower face side of the hopper 2. Then, because the other end of the torsion spring 53 is engaged with the hopper pressing portion 49, the hopper action end 55 always urges the hopper 2 upward.

The second cam 45 of the cam shaft 13 contacts and uses the second cam receiving portion 51 of the hopper actuating member 15 as a cam follower so as to perform cam operation. By pivoting the hopper actuating member 15 around the pivotal shaft 50 utilizing the cam action of the second cam 45, the hopper pressing portion 49 recedes downward of the hopper 2 at predetermined timing, and pressing force on the hopper 2 from the lower side is released. Thus, the hopper 2 pivots downward by the own weight of the hopper 2.

Next, as shown in FIG. 2 and FIG. 3, the cam transmission return member 16 has a substantially cylindrical shape as a whole, and a first cam receiving portion 57 and a spring engaging portion 59 are formed on the peripheral surface of the cylinder. One end of the cam transmission return member 16 is coupled to a shaft (not shown) that is provided on the base frame 47 so as to be pivotable about the axis of the cylinder and so that the axis of the cylinder is parallel to the feeding roller shaft 4. In addition, two guide plates 61 are formed at the other end of the cam transmission return member 16, and a guide clearance 63 is formed between these two guide plates 61. The first cam receiving portion 57 performs cam action in cooperation with the first cam 43 of the cam shaft 13, and the other end of a coil spring 65, of which one end is fixed to the base frame 47, is engaged with the spring engaging portion 59.

As shown in FIG. 2, FIG. 3 and FIG. 5, the return action member 17 is formed to include a shaft portion 67 formed on the side of the cam transmission return member 16, a U-shaped lever proximal portion 69 formed to extend over the hopper actuating member 15, and a shaft end 68 formed to extend on the opposite side with respect to the shaft portion 67 of the lever proximal portion 69. The shaft end 68 is pivotally supported by an oblong shaft receiving portion 48, which is provided on the base frame 47, so that it is movable in a direction to recede from a region in which return action is performed by the medium return levers 9. A slide plate 70 is integrally formed with the end of the shaft portion 67. The slide plate 70 is inserted in between the guide clearance 63 of the cam transmission return member 16 so that it is slidable in a direction perpendicular to the axis of the shaft portion 67.

One ends of torsion springs 71 are respectively engaged with both outside portions of the U-shaped lever proximal portion 69, and the other ends of the torsion springs 71 are fixedly engaged with the base frame 47. The lever proximal portion 69 as a whole receives urging force applied in an advancing direction opposite to the receding direction from the torsion springs 71 (in a direction to push up a feeding recording material from the rear face thereof). By the urging force applied in the advancing direction, the shaft end 68 is always pressed against the front end of the shaft receiving portion 48. The above described medium return levers 9 are formed at both distal end portions of the U-shaped lever proximal portion 69.

That is, the return action member 17 receives force in the advancing direction by the urging force of the torsion springs 71 due to pivotal movement of the medium return levers 9 when the distal ends 10 thereof return the recording material P, which is overlappingly fed to the separation pad 7, to the feeding tray 3, while, on the other hand, the return action member 17 receives force to push back against the force in the advancing direction in such a manner that the distal ends 10 are pressed against the rear face of the uppermost recording material P. Thus, in a state where a cam guide face 77, which will be described later, is not provided, the distal end 10 of each medium return lever 9 initially pivots along a simple circular arc locus and, after the distal end 10 contacts the rear face of the recording material P, takes a pivot locus along which both of the above forces are balanced.

In this embodiment, the attitude of a feeding recording material is determined by an auxiliary roller 6 that determines the attitude so that the recording material does not contact the feeding roller 5. The distal end 10 of each medium return lever 9 contacts the rear face of the recording material at a portion of the pivot locus that is closer in distance from the contact point with the auxiliary roller 6. In this structure, when the rigidity of a recording material is high, the recording material is less likely to bend, so that there is a possibility that scratches are left on the rear face of the recording material when the medium return levers 9 are pushed back. In addition, in the fixing structure of the medium return levers 9, because the push-back phase angle is close to horizontal, contribution of gravity cannot be expected, and, by receiving pinching resistance of the shaft receiving portion, the medium return levers 9 are further less likely to be pushed back. Thus, the scratches tend to be left. Furthermore, it may problematically cause a step out of the drive motor 10.

Figure 6:
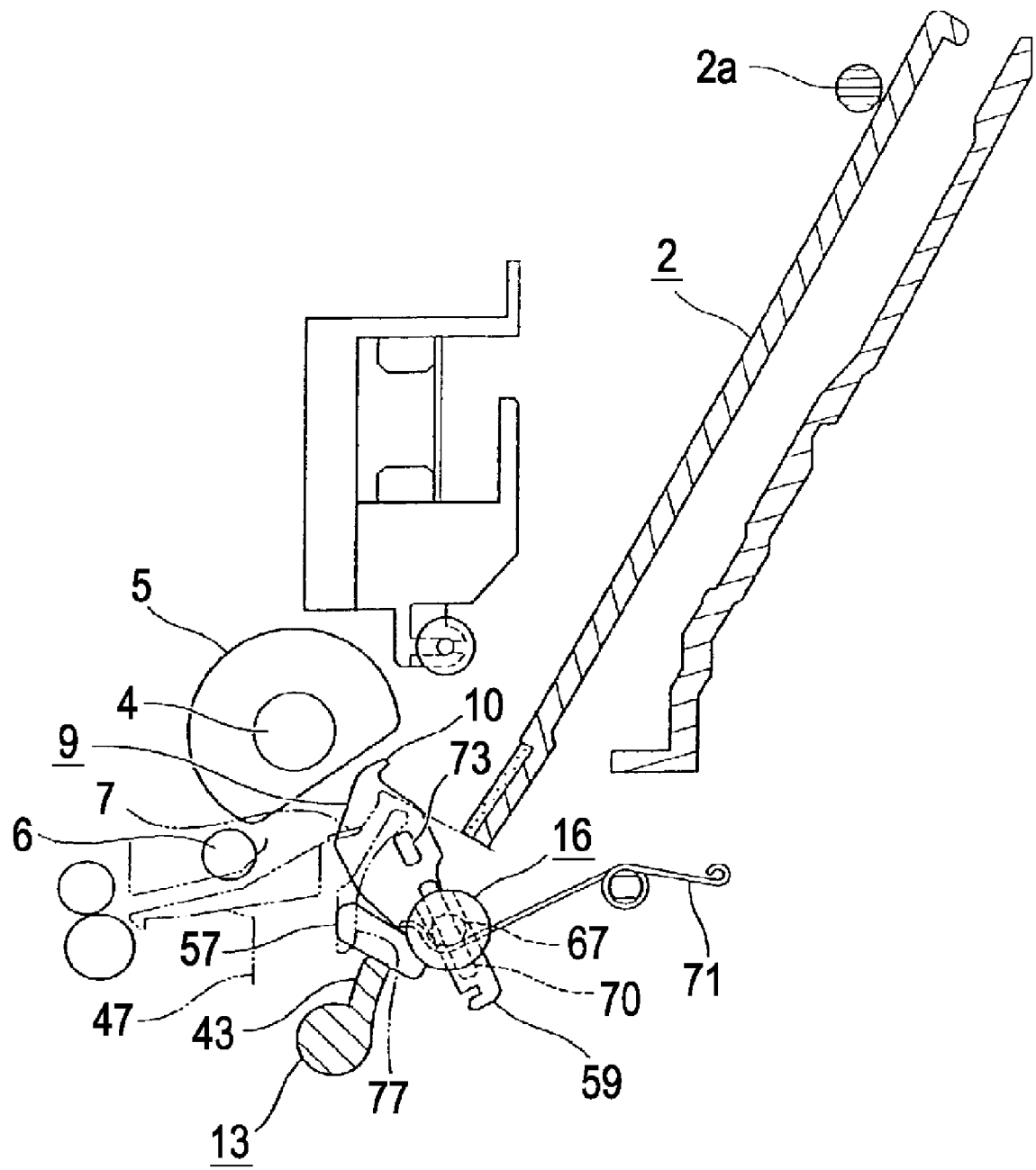
FIG. 6 is a view that shows the relationship between the rotational position of a cam shaft and the medium return lever step by step.

To eliminate this problem, as shown in FIG. 6, according to the present invention, a cam guided portion 73 is formed on the outside face of each medium return lever 9, while, on the other hand, a cam guide face 77 that guides the cam guided portion 73 is formed in a cutout 75 (see FIG. 1) that is formed at a corresponding portion of the base frame 47 to have the medium return lever 9 extend to the upper surface side of the hopper 2. The above described torsion springs 71 urge the lever proximal portion 69 toward the cam guide faces 77. In this manner, the cam guided portions 73 are always urged so as to be guided as they are in contact with the cam guide faces 77. Thus, the medium return levers 9 are always urged in a direction to extend upward from the upper surface of the hopper 2, and the extended positions thereof are regulated by the cam guide faces 77.

Here, with reference to FIG. 2, FIG. 3, and FIG. 6 to FIG. 11, the functions of the hopper 2 and the medium return levers 9 will be described. Firstly, as shown in FIG. 2 and FIG. 6, when the medium return levers 9 are up, that is, before feeding of the recording material P is initiated, the second cam 45 of the cam shaft 13 makes the hopper pressing portion 49 recedes to the lower side of the hopper 2 (see FIG. 10) by the cam action of the hopper actuating member 15 with the second cam receiving portion 51 to thereby release pressing from the lower side of the hopper 2. Thus, the hopper is pivoted to the lower side due to the own weight of the hopper 2. Then, the recording material P on the feeding tray 3 is not in contact with the feeding roller 5. In addition, the first cam 43 of the cam shaft 13 performs cam action on the first cam receiving portion 57 to pivot the cam transmission return member 16 against the spring tensile action of the coil spring 65. In accordance with this, the lever proximal portion 69 pivots, so that the distal ends 10 of the medium return levers 9 are extended upward from the cutout 75.

Figure 7:
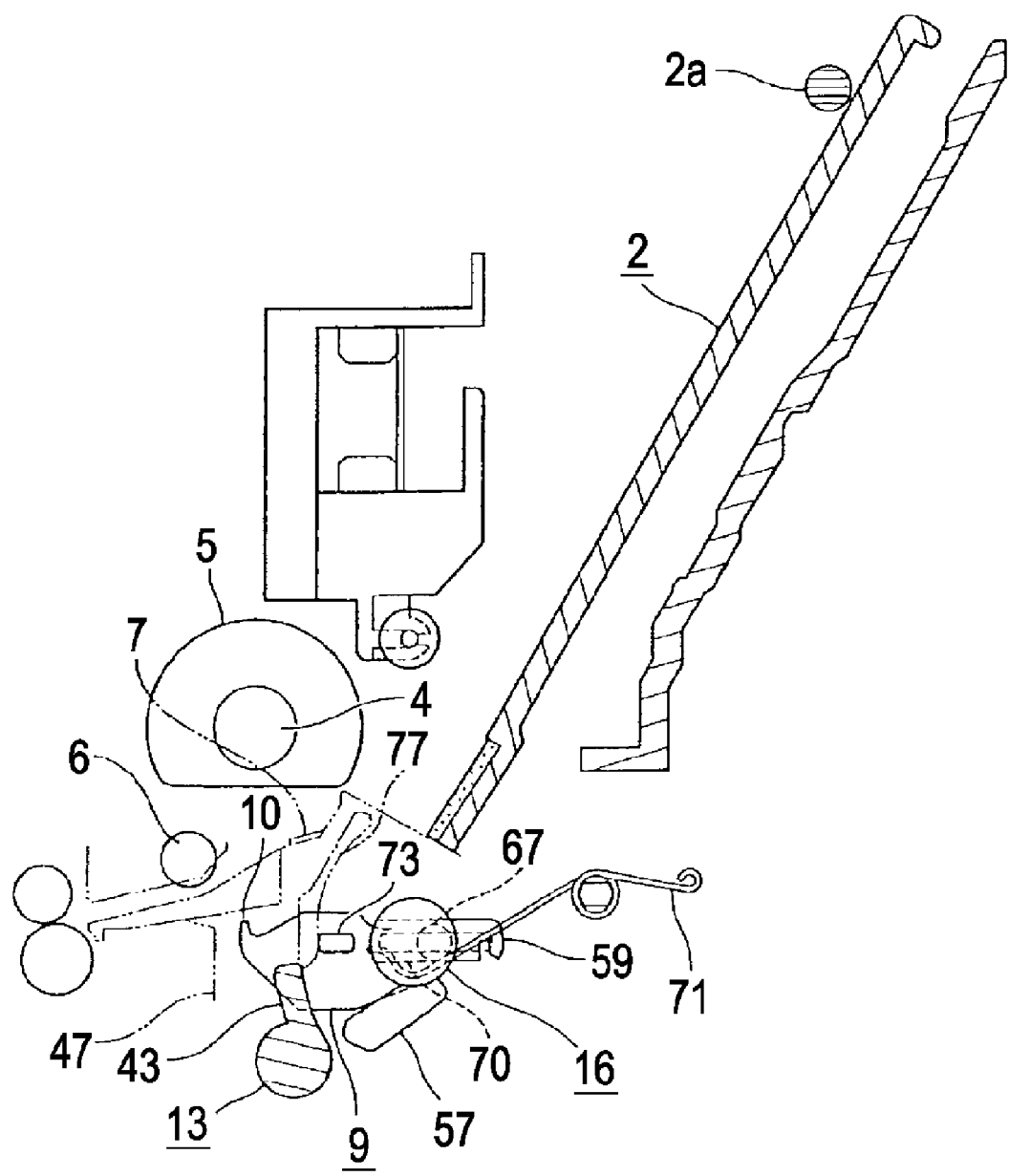
FIG. 7 is a view that shows the relationship between the rotational position of the cam shaft and the medium return lever step by step.
Figure 8:
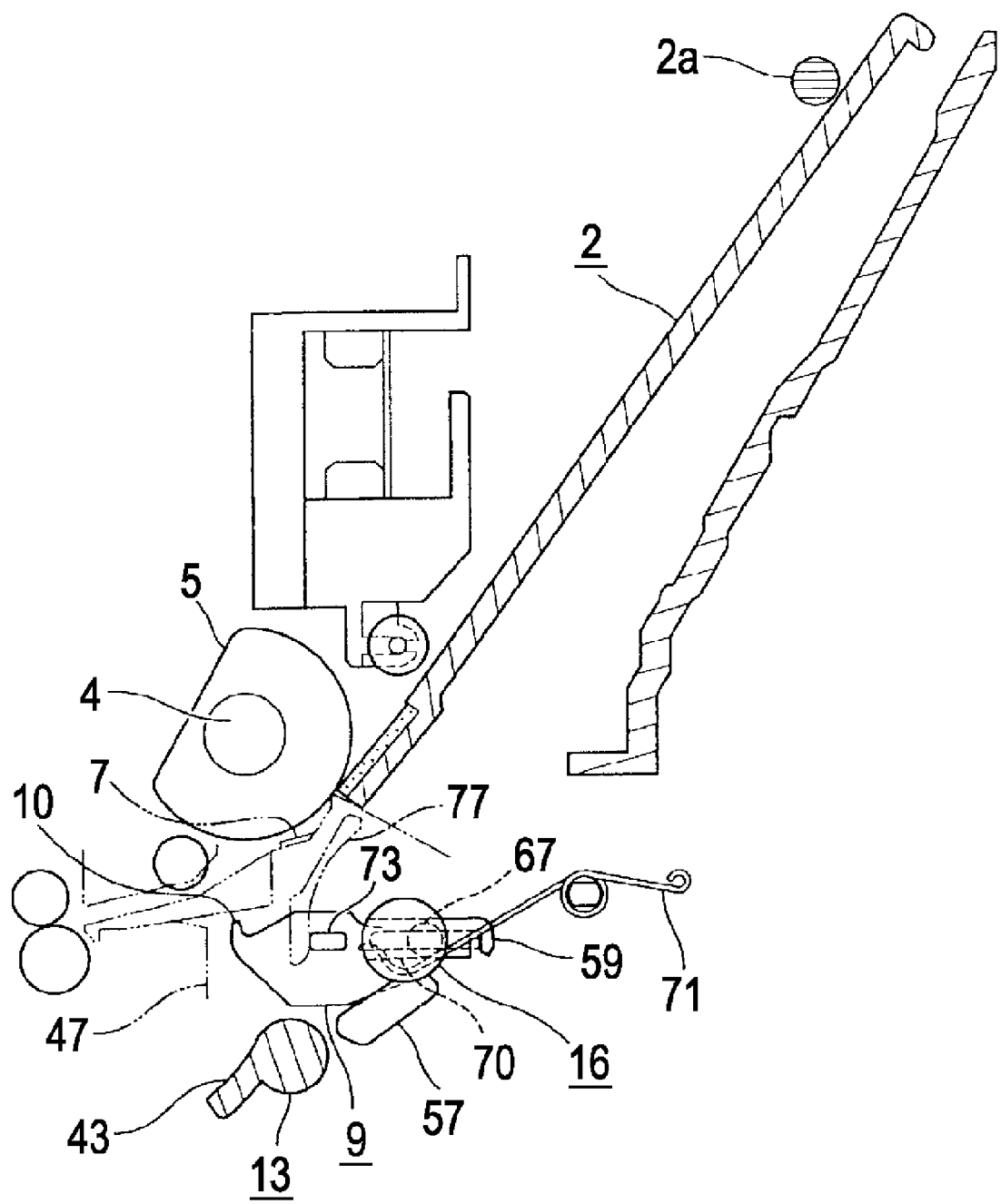
FIG. 8 is a view that shows the relationship between the rotational position of the cam shaft and the medium return lever step by step.

As shown in FIG. 7, as the cam shaft 13 is rotated and the first cam 43 is disengaged from the first cam receiving portion 57, the distal end 10 of each medium return lever 9 recedes downward (see FIG. 3) by the spring tensile force of the coil spring 65. As the cam shaft 13 is rotated to a position shown in FIG. 8, the second cam 45 of the cam shaft 13 is disengaged from the second cam receiving portion 51 of the hopper actuating member 15. Then, the hopper pressing portion 49 presses the lower face side of the hopper 2 upward by the action of the torsion spring 53 (see FIG. 11), so that the hopper 2 is lifted. In this manner, the uppermost recording material P on the feeding tray 3 contacts the feeding roller 5, and feeding is initiated by the rotation of the feeding tray 3.

Figure 9:
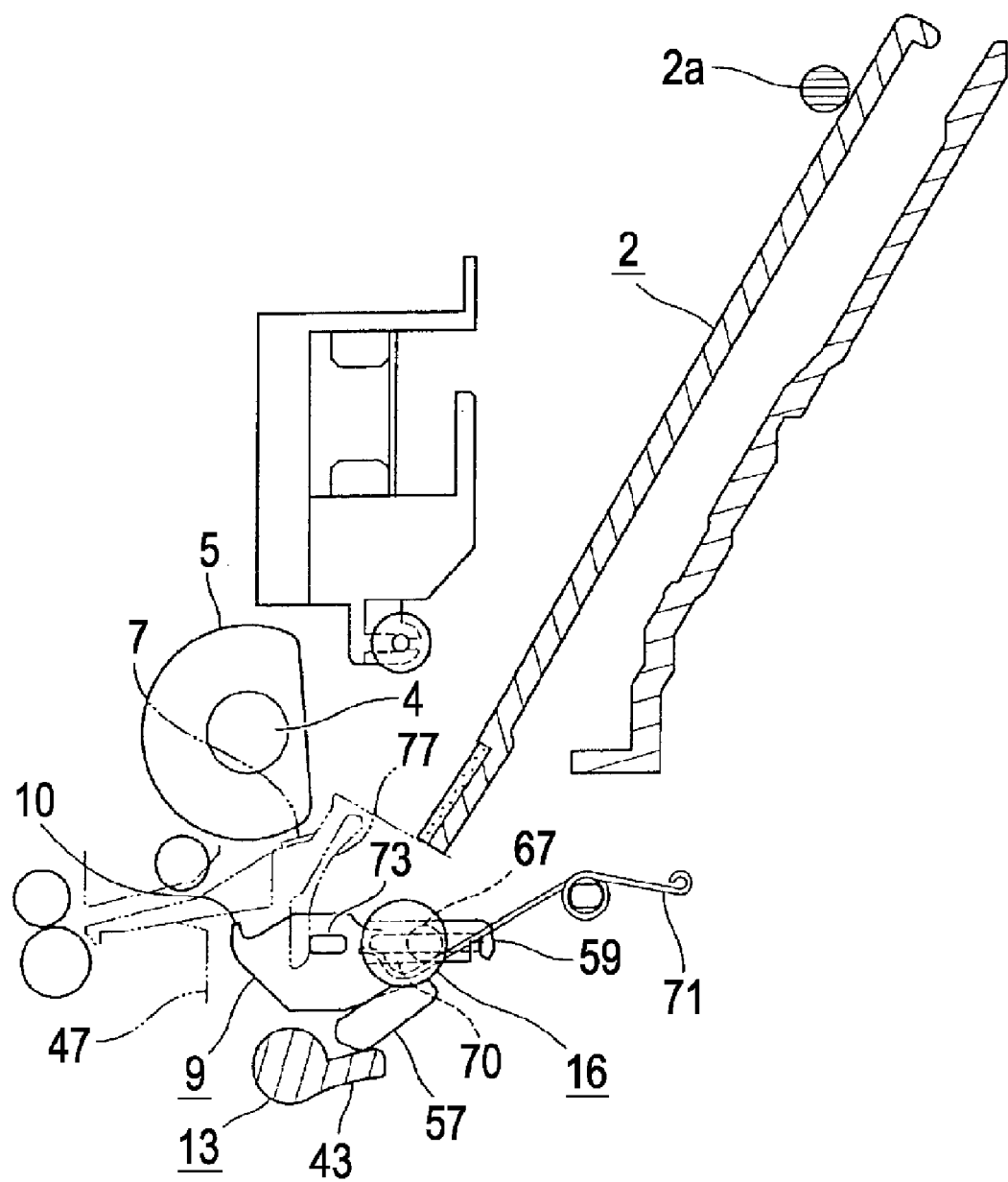
FIG. 9 is a view that shows the relationship between the rotational position of the cam shaft and the medium return lever step by step.

As the cam shaft 13 is rotated to a position shown in FIG. 9, the first cam 43 of the cam shaft 13 initiates to engage the first cam receiving portion 57 again. Then, while the cam shaft 13 is rotating from the position shown in FIG. 9 to the position shown in FIG. 6, the shaft portion 67 and the lever proximal portion 69 are rotated together through the cam transmission return member 16. At this time, because the cam guided portion 73 is guided by the cam guide faces 77, the position of axis that connects the shaft portion 67 with the shaft end 68 (which is the same as the axis of the shaft portion 67) recedes. In accordance with this, the locus of the distal end 10 of each medium return lever 9 passes below the locus thereof without the cam guided portion 73 and the cam guide face 77. The shape of the cam guide faces 77 are determined so that this locus coincides with the locus that extends so that the distal end 10 of each medium return lever 9 traces the shape of the rear face of the feeding recording material P.

That is, the distal end 10 of each medium return lever 9 contacts the rear face of the recording material at a position that is located a distance from the contact point with the auxiliary roller 6. Because the recording material, if it has the same rigidity, easily bends owing to an increased distance, it is less likely to leave scratches on the rear face of the recording material when the medium return levers 9 are pushed back. In addition, because the push-back phase angle is larger than horizontal, it can be expected that the gravity contributes, and there is less pinching of the shaft receiving portion, the medium return levers 9 further tend to be pushed back. Thus, the above scratches are further less likely to be left. Furthermore, it is less likely to lead to a problem, that is, a step out of the drive motor 10.

As described above, the cam guided portions 73 are guided by the cam guide faces 77, the distal end 10 of each medium return lever 9 pivots along the locus that extends along the attitude of the rear face of the feeding recording material P while each medium return lever 9 recedes in a direction of a straight line that connects the distal end 10 of each medium return lever 9 and the pivotal fulcrum of the medium return lever 9. Thus, because an unreasonable load or an excessive frictional force that is generated when the distal end 10 of each medium return lever 9 passes so as to push up the rear face of the feeding recording material P, it is possible to eliminate inconveniences, such as scratching the rear face of the feeding recording material or a step out of the drive motor 19 due to a load.

The drive transmission system 11 to the feeding roller 5 and the cam shaft 13 will now be described with reference to FIG. 12 to FIG. 14. The first gear 83 (the gear 21 in FIG. 1) engages an output pinion 81 of the drive motor 19, and driving force is transmitted through a second gear 85 that forms a complex gear with the first gear 83 to an automatic feeding mechanism of the hopper 2, while driving force is transmitted through a third gear 87 that forms a complex gear with the first gear 83 to an ink suction pump, similarly.

The second gear 85 is engaged with a fourth gear 89, and further the fourth gear 89 is engaged with a fifth gear 91 and an eighth gear 11 that is a lever pivot gear. The fifth gear 91 includes a ratchet wheel 92 that corresponds to a drive side gear formed integrally with the fifth gear 91 (see FIG. 14), and the specifications of this ratchet wheel 92 is a diameter of 7.5 mm and 10 teeth, which is considerably small. The fifth gear 91 and the ratchet wheel 92 are freely rotatable relative to the feeding shaft 78 of the feeding roller 5. As the toothed portion 94 formed inside the clutch member 93 engages the ratchet wheel 92, driving force is then transmitted to the feeding shaft 78 of the feeding roller 5.

That is, the clutch member 93 is pivotable about a swing fulcrum 96, and the clutch member 93 is connected to a clutch auxiliary member 97 at the swing fulcrum 96 so that they are pivotable relative to each other. A torsion coil spring 95 is provided between the clutch member 93 and the clutch auxiliary member 97, and, by the action thereof, the clutch member 93 is always urged in a direction in which the toothed portion 94 engages the gear tooth 79 of the ratchet wheel 92. The clutch auxiliary member 97 is fixed to the feeding shaft 78 of the feeding roller 5. Thus, driving force is transmitted to the feeding shaft 78 in such a manner that the toothed portion 94 engages the ratchet wheel 92. An engaging pawl 98 is formed on the outer periphery of the clutch member 93.

A sixth gear 99, which forms a driven system gear, is provided on the feeding shaft 78 of the feeding roller 5. A seventh gear 101, the gear 21a and the cam shaft gear 41 are sequentially engaged with the sixth gear 99 to form a gear series. Note that the drive transmission system that follows the cam shaft gear 41 is described above (see FIG. 1 to FIG. 11).

As shown in FIG. 15(b), in the present embodiment, an engaging projecting portion 100 is formed on the eighth gear 111 that is engaged with the fourth gear 89 so as to form a circular arc shape extending over 90 degrees, and is connected to the side of a trigger lever 115 through a differential device, which will be described later. The trigger lever 115 corresponds to a lever member and is pivotable around a lever shaft 113. The trigger lever 115 includes an arm 116, a driven differential gear 119 formed around the lever shaft 113, and a friction clutch mechanism 121. A clutch engaging portion 123 is formed at the distal end of the arm 116. The clutch engaging portion 123 extends toward the clutch member 93 and is engageable with the engaging pawl 98. In addition, engaging faces 125, 127 (see FIG. 14) are formed respectively on the engaging pawl 98 and the clutch engaging portion 123 and contact each other when they are engaged.

In the present embodiment, an engaged projecting portion 129 is formed on the driven differential gear 119 so as to extend over 170 degrees. When the end of the above described engaging projecting portion 100 is engaged with the engaged projecting portion 129, pivotal driving force is transmitted to the engaged projecting portion 129. In addition, when the engaging projecting portion 100 is moving inside a non-transmission portion 131 of the driven differential gear 119, at which the engaged projecting portion 129 is not formed, driving force is not transmitted to the driven differential gear 119. Thus, the engaging projecting portion 100 and the engaged projecting portion 129 form the differential device.

The friction clutch mechanism 121, as shown in FIG. 27, includes an annular portion 135 formed around a cylindrical proximal portion 133 of the driven differential gear 119 with a slight clearance, an accommodation portion 137 that accommodates a compression spring 117, and a slide contact piece 139 that is elastically deformable toward the cylindrical proximal portion 133 by the elastic force of the compression spring 117 at a boundary between the accommodation portion 137 and the annular portion 135. Then, owing to the elastic force of the compression spring 117, the slide contact piece 139 is pressed to contact the surface of the cylindrical proximal portion 133, so that the driven differential gear 119 is rotated. At this time, as long as there is no external restriction on the pivotal movement of the trigger lever 115, the trigger lever 115 also pivots together by the frictional force between the slide contact piece 139 and the cylindrical proximal portion 133.

Next, with reference to FIG. 15 to FIG. 26, switching between a clutch engaged state and a clutch non-engaged state by the operation of the clutch member 93 will be described. Note that, in the present embodiment, the "clutch engaged state" means a state where the toothed portion 94 of the clutch member 93 is engaged with the gear tooth 79 of the ratchet wheel 92 and the "clutch non-engaged state" means a state where the toothed portion 94 of the clutch member 93 is disengaged from the gear tooth 79 of the ratchet wheel 92.

First, switching to the clutch non-engaged state will be described. As shown in FIG. 21, when the drive motor 19 is driven in forward rotation, the fourth gear 89 rotates in a direction indicated by the arrow shown in FIG. 21(a). This driving force is transmitted to the fifth gear 91 and the ratchet wheel 92 and also transmits driving force that pivots the trigger lever 115 toward the clutch member 93 through the eighth gear 111. Then, after the clutch member 93 rotates in the clockwise direction to be a state shown in FIG. 22(a), the clutch member 93 further rotates in the clockwise direction and the engaging pawl 98 engages the clutch engaging portion 123, so that the clutch member 93 swings about the swing fulcrum 96 in the counterclockwise direction in FIG. 15(a) against the tensile force of the torsion coil spring 95. In this manner, the toothed portion 94 of the clutch member 93 is released from the gear tooth 79 of the ratchet wheel 92 to be the clutch non-engaged state.

When the clutch engaging portion 123 engages the engaging pawl 98, as shown in FIG. 16, the clutch engaging portion 123 pushes the engaging pawl 98 in a direction indicated by the arrow 143 and the clutch member 93 is swung so that the toothed portion 94 of the clutch member 93 is located completely away from the gear tooth 79 of the ratchet wheel 92 with a clearance. Thus, as shown in FIG. 16, the pivot locus 141 of the clutch engaging portion 123 overlaps the engaging pawl 98. By employing the above configuration, it is possible to prevent click sound due to a collision between the toothed portion 94 of the clutch member 93 and the gear tooth 79 of the ratchet wheel 92.

As described above, the operation by which the clutch engaging portion 123 pushes the engaging pawl 98 in a direction indicated by the arrow 143 is regulated by angles at which the engaging face 125 of the engaging pawl 98 and the engaging face 127 of the clutch engaging portion 123 are formed. Therefore, these engaging faces 125, 127 are configured to engage each other at an angle at which the clutch member 93 is swung so that the toothed portion 94 of the clutch member 93 is located completely away from the gear tooth 79 of the ratchet wheel 92 with a clearance.

Next, switching to the clutch engaged state will be described. As the drive motor 19 is driven in reverse rotation from the state shown in FIG. 15, as shown in FIG. 17(b), the eighth gear 111 rotates until the first end 145 of the engaging projecting portion 100 contacts the engaged projecting portion 129. After the first end 145 of the engaging projecting portion 100 contacts the engaged projecting portion 129, the driven differential gear 119 rotates and initiates to pivot the trigger lever 115 in the counterclockwise direction, and the trigger lever 115 pivots to a position shown in FIG. 18. Thus, because the clutch engaging portion 123 is disengaged from the engaging pawl 98, by the urging force of the torsion coil spring 95, the clutch member 93 swings around the swing fulcrum 96 and the toothed portion 94 tries to engage the ratchet wheel 92.

However, as shown in FIG. 18, there is a possibility that the toothed portion 94 of the clutch member 93 collides with the distal end of the gear tooth 79 of the ratchet wheel 92 and thereby the toothed portion 94 does not engage the gear tooth 79. Then, by driving the drive motor 19 in forward rotation, the ratchet wheel 92 is rotated by one gear tooth amount in the clockwise direction in FIG. 19(a) and thereby the toothed portion 94 is reliably engaged with the gear tooth 79. By the forward rotation of the drive motor 19, the eighth gear 111 rotates in the clockwise direction in FIG. 19(b). However, because the engaging projecting portion 100 passes the non-transmission portion 131, rotational driving force is not transmitted to the trigger lever 15 during then.

Note that, in the present embodiment, the differential angle from the state shown in FIG. 17(b) to the state shown in FIG. 15(b) is 100 degrees, and the rotational angle for rotating by one gear tooth amount is 67.5 degrees, so that there is 32.5 degrees left at the time point of FIG. 19(b) until driving force is transmitted to the trigger lever 115. Thus, because the trigger lever 15 does not rotate due to the differential device when the drive motor 19 is driven in forward rotation, the clutch engaging portion 123 does not re-engage the engaging pawl 98.

As shown in FIG. 19(a), the toothed portion 94 engages the gear tooth 79 to be the clutch engaged state, and the clutch member 93 initiates to rotate. As the engaging projecting portion 100 pivots by the remaining 32.5 degrees and the second end 147 of the engaging projecting portion contacts the engaged projecting portion 129 (see FIG. 20(b)), the trigger lever 115, as shown in FIG. 21(a), pivots toward the clutch member 93 again. However, the engaging pawl 98 is pivoted upward at that time, so that the clutch engaging portion 123 does not engage the engaging pawl 98. Note that, in the state shown in FIG. 21(a), by the cam action of the second cam 45, the hopper pressing portion 49 has initiated to pivot and started feeding operation.

When the clutch member 93 rotates substantially one revolution and just before the engaging pawl 98 engages the clutch engaging portion 123, as shown in FIG. 22(a), the second cam follower 51 reaches a top portion 149 of the second cam 45. As the second cam follower 51 passes the top portion 149 of the second cam 45, the second cam follower 51 actively slides down on the cam inclined face 151 in accordance with the profile of the second cam 45 and then tries to fit into a recessed portion 153 by the urging force of the torsion spring 53. Then, the engaging pawl 98 is still not engaged with the clutch engaging portion 123.

By the action by which the second cam follower 51 actively slides down on the cam inclined face 151, the cam shaft 13 also actively moves and then the side of the cam shaft 13 is switched from the driven side to the drive side. By the driving force at this time, the clutch member 93 swings and the engaging pawl 98 engages the clutch engaging portion 123, while the clutch member 93 actively moves. Thus, as shown in FIG. 25, the toothed portion 94 of the clutch member 93 is spaced apart from the gear tooth 79 of the ratchet wheel 92 (reference numeral 155). Then, when in this spaced apart state, the engaging pawl 98 engages the clutch engaging portion 123. Thus, by the swinging motion of the clutch member 93, as shown in FIG. 26(a), the toothed portion 94 of the clutch member 93 comes off from the gear tooth 79 of the ratchet wheel 92 instantly without resistance, thus making it possible to be the clutch non-engaged state.

FIG. 23 and FIG. 24 are views that show a state where power is transmitted in such a manner that the toothed portion 94 of the clutch member 93 is engaged with the gear tooth 79 of the ratchet wheel 92. When in the above state, it is necessary to prevent tooth jump from occurring as the toothed portion 94 of the clutch member 93 comes off from the gear tooth 79 of the ratchet wheel 92. Then, in a state where the cam follower 51 is not fitted into the recessed portion 153, as shown in FIG. 24, the toothed portion 94 and the gear tooth 79 of the ratchet wheel 92 are formed so that at least part of the pivot locus 157 (in this example, the distal end portion 156 of the toothed portion 94 adjacent to the gear tooth 79) of the toothed portion 94 of the clutch member 93, when trying to switch to the clutch non-engaged state, runs across the shape of the gear tooth 79 of the ratchet wheel 92. That is, in FIG. 24, in order to disengage the toothed portion 94 from the gear tooth 79, it is necessary that the distal end portion 156 pivots along the pivot locus 157. However, because the pivot locus 157 runs across the gear tooth 79, the toothed portion 94 cannot be disengaged from the gear tooth 79 unless the ratchet wheel 92 rotates in a reverse direction.

Thus, when the toothed portion 94 is engaged with the gear tooth 79 and power is being transmitted, there is almost no possibility that the engagement between the toothed portion 94 and the gear tooth 79 is released, and thereby tooth jump does not occur. On the other hand, when switched to the clutch non-engaged state, as shown in FIG. 25, the toothed portion 94 is spaced apart from the gear tooth 79 and is likely to come off, so that, even when the configuration in which the pivot locus 157 runs across the gear tooth 79 is employed as shown in FIG. 24, there is no possibility that a state where the toothed portion 94 does not come off from the gear tooth 79 occurs.

The embodiment in which the invention is applied to the ink jet recording apparatus is described above, but the invention may be applied to a liquid ejecting apparatus provided with a conveyance apparatus that feeds a liquid ejected target material as in the case of the above.

The disclosure of Japanese Patent Application No. 2006-211654 filed Nov. Aug. 3, 2006 including specification, drawings and claims is incorporated herein by reference in its entirety.

The invention claimed is:

1. A clutch apparatus for connecting or disconnecting power transmission from a drive side gear with gear teeth, which is driven by a drive motor for rotation, to a driven side gear, comprising:
   a cam which has an inclined face portion and a recessed portion and is provided on a driven rotary shaft of the driven side gear or a gear that is engaged at a downstream side of drive transmission of the driven side gear;
   a cam follower provided to press contact the cam by the urging force of a torsion spring;
   a clutch member that has an engaging pawl and a toothed portion that is engageable with the drive side gear, and that is switchable along a pivot locus between a clutch engaged state between the toothed portion and the drive side gear and a clutch non-engaged state therebetween as the clutch member swings;
   an arm that is pivotable about a pivot fulcrum;
   a clutch engaging portion that is provided on the arm and engageable with the engaging pawl; and
   a lever member that swings the clutch member to switch from the clutch engaged state to the clutch non-engaged state in such a manner that the clutch member and the driven side gear engage the engaging pawl with the clutch engaging portion,
   wherein the toothed portion of the clutch member and the gear teeth of the drive side gear are formed so at least a portion of the pivot locus of the toothed portion of the clutch member engages with the gear teeth of the drive side gear when switching to the clutch non-engaged state,
   wherein the cam follower slides along the inclined face of the cam and into the recessed portion by the urging force of the torsion spring as the cam rotates, and
   wherein the cam follower sliding along the inclined face of the cam causes the driven rotary shaft to switch from engaging with the driven side gear to engaging with the drive side gear so that the driving force of the drive motor causes the clutch member to rotate so that the engaging pawl engages the clutch engaging portion in the clutch non-engaged state.

* * * * *